US012784457B2

(12) United States Patent
Simard et al.

(10) Patent No.: US 12,784,457 B2
(45) Date of Patent: Nov. 3, 2026

(54) METHODS AND SYSTEMS FOR PROVIDING NEAR LIVE VIDEO

(71) Applicant: GENETEC INC., Saint-Laurent (CA)

(72) Inventors: Daniel-Olivier Simard, Pointe-Claire (CA); Mathieu Fournier, Laval (CA)

(73) Assignee: GENETEC INC., St-Laurent (CA)

( * ) Notice: Subject to any disclaimer, the term of this patent is extended or adjusted under 35 U.S.C. 154(b) by 0 days.

(21) Appl. No.: 18/931,537

(22) Filed: Oct. 30, 2024

(65) Prior Publication Data

US 2026/0120466 A1 Apr. 30, 2026

(51) Int. Cl.
*G06V 20/52* (2022.01)
*G06V 20/40* (2022.01)

(52) U.S. Cl.
CPC .............. *G06V 20/52* (2022.01); *G06V 20/44* (2022.01)

(58) Field of Classification Search
None
See application file for complete search history.

(56) References Cited

U.S. PATENT DOCUMENTS 6,166,729 A 12/2000 Acosta et al.
8,001,297 B2 8/2011 Volodarsky et al.
8,613,083 B1 12/2013 Njemanze et al.
9,900,497 B2 2/2018 Tsai et al.
9,912,902 B2 3/2018 Oien et al.
10,332,564 B1 6/2019 Andrizzi et al.
10,819,943 B2 10/2020 Van Dan Elzen
11,490,092 B2 11/2022 Zhao et al.
11,823,539 B2 11/2023 Hodge et al.
12,015,834 B2 6/2024 Doucleff et al.
2006/0158968 A1 7/2006 Vanman et al.
2006/0177119 A1 8/2006 McPheely et al.
2008/0077742 A1 3/2008 Ashton et al.
2010/0118147 A1 5/2010 Dorneich et al.
2010/0123826 A1 5/2010 Sagi
2010/0299448 A1 11/2010 Cuoq
2011/0246657 A1 10/2011 Glow
2013/0198789 A1 8/2013 Streeter et al.
(Continued)

FOREIGN PATENT DOCUMENTS

WO 2004068855 8/2008
WO 2014092600 6/2014

*Primary Examiner* — Heather R Jones
(74) *Attorney, Agent, or Firm* — Realize IP Agency Inc.; Tyler Nechiporenko

(57) ABSTRACT

Methods, systems, and computer-readable media for providing near live video are described herein. A security event is obtained at a surveillance computing system. The surveillance computing system identifies a camera device associated with the security event. The camera device transmits video data comprising data blocks to a networked video archiver for storage. The surveillance computing system transmits a configuration command to the camera device identified as associated with the security event. The configuration command causes the camera device to perform one or more operations including modifying the transmitting of the video data to allow for a computing device to display near live video of the camera device that would otherwise be unavailable for retrieval from the networked video archiver in absence of the modifying of the transmitting of the video data.

31 Claims, 17 Drawing Sheets

(56) References Cited

U.S. PATENT DOCUMENTS

| | | | | |
|---|---|---|---|---|
| 2015/0085130 | A1* | 3/2015 | Hicks, III | G08B 19/005 348/153 |
| 2016/0012856 | A1* | 1/2016 | Cave, Jr. | G11B 27/005 386/241 |
| 2018/0063011 | A1 | 3/2018 | Hammarqvist et al. | |
| 2018/0316949 | A1 | 11/2018 | Banerjee | |
| 2020/0322566 | A1 | 10/2020 | Vanman et al. | |
| 2022/0286721 | A1 | 9/2022 | Tielemans et al. | |
| 2023/0177948 | A1* | 6/2023 | Wright | H04L 9/3239 340/539.26 |

* cited by examiner

401

| Timestamp (411) | Door ID (412) | Event (413) |
|---|---|---|
| 9-19-2024 10:47:56 | D1001 | Door Forced Open |

FIG. 4A

402

| Timestamp (421) | Camera ID (422) | Event (423) |
|---|---|---|
| 9-20-2024 9:23:32 | C0003 | Motion Detected |

FIG. 4B

403

| Timestamp (431) | Camera ID (432) | Appliance ID (433) | Event (443) |
|---|---|---|---|
| 9-20-2024 9:23:32 | C0003 | CA001 | Motion Detected |

FIG. 4C

404

| Timestamp (441) | Alarm ID (442) | Event (443) |
|---|---|---|
| 9-21-2024 14:12:05 | A0004 | Alarm |

FIG. 4D

501

511, 512, 515, 516

| Camera ID | Door ID |
|---|---|
| C0003 | D1001 |
| C0002 | D1002 |
| C0004 | D1007 |
| ●●● | ●●● |

FIG. 5A

502

521, 522, 525, 526

| Camera ID | Alarm ID |
|---|---|
| C0001 | A0001 |
| C0003 | A0004 |
| C0004 | A0005 |
| ●●● | ●●● |

FIG. 5B

502

521, 522, 526

| Camera ID | Alarm ID |
|---|---|
| C0001 | A0001 |
| C0003 | A0004 |
| C0004 | A0005 |
| ●●● | ●●● |

503

531, 532, 535, 536

| Camera ID | Appliance ID |
|---|---|
| C0001 | CA001 |
| C0003 | CA001 |
| C0004 | CA004 |
| ●●● | ●●● |

FIG. 5C

504

541, 542, 543, 545, 546

| Camera ID | Appliance ID | Alarm ID |
|---|---|---|
| C0001 | CA001 | A0001 |
| C0003 | CA001 | A0004 |
| C0004 | CA004 | A0005 |
| ●●● | ●●● | ●●● |

FIG. 5D

METHODS AND SYSTEMS FOR PROVIDING NEAR LIVE VIDEO

TECHNICAL FIELD

The present disclosure relates generally to providing near live video, and, more particularly, to methods and systems for providing near live video of a camera device to a computing device by a surveillance computing system.

BACKGROUND

The use of video cameras to monitor areas for security purposes is widespread. Video surveillance systems usually allow a user to view either live video or archived video. Live video is transmitted from the video camera to the user's device for display in real-time, often via cloud services. Archived video of past recordings can be transmitted to the user's device for display from a video archiver, which may be an on-premises server or implemented in the cloud.

Modern archiving of video is typically done in blocks for efficiency. A camera can accumulate data into blocks and transmit the blocks to the archiver for storage. Generating the blocks at the camera with a large data block size is typically preferred to reduce cloud computing transactions and decrease the costs to store video in the cloud. Accordingly, the camera can build a large data block and then transmit it to the video archiver for storage. The video archiver processes each large data block that it receives and eventually makes the archived video available for retrieval.

However, if a user would like to view video that is not quite live but very recent, it is common that the camera is not configured to provide non-live video and the video archiver has either not received the most recent data block from the camera as the camera is still generating the large data block or the video archiver has not had sufficient time to process the most recent large data block to make the recent video available.

Thus, there is a need to provide recent non-live video, such as, for example, when a camera is conventionally configured to transmit video data in large data blocks to a video archiver.

SUMMARY

The following presents a simplified summary of one or more implementations in accordance with aspects of the present disclosure, in order to provide a basic understanding of such implementations, without limiting the embodiments presented within the present disclosure.

Existing video cameras may be configured to generate data blocks of video with a large block size for efficiency reasons. More specifically, the use of larger data blocks over smaller data blocks is usually preferred, when the data blocks are transmitted to a cloud-based video archiver, as the use of smaller data blocks typically requires more cloud transactions and increases the costs to store video in the cloud compared to the use of larger data blocks. However, the use of large data blocks is not without its drawbacks. If a user requests to view video that is not quite live but very recent, existing surveillance computing systems might not be able to handle such requests.

For example, if a surveillance computing system receives a door forced open alarm, the user may want to see what caused the alarm. The live video only shows what is live and, in this example, only shows that the door is open, and as such the user wants to see recent non-live video, such as what occurred 30 seconds ago. Unfortunately, this recent non-live video is not yet in the video archiver, or at least not yet stored in a retrievable format. It is common to have to wait 2 minutes or so before the user can see the stored video. Due to the large size of the data blocks, the camera is typically still building the data block to be sent to the video archiver for storage when the user is requesting to view the recent non-live video (e.g., the video that is 30 seconds old). This means that the recent non-live video is not available right away.

While the camera could be configured to always use smaller data block sizes, this is not practical. This is because if smaller data blocks were always used, compared to larger data blocks, the number of cloud transaction at the video archiver would be significantly more, and the cloud computing cost would also be significantly more costly.

The present disclosure presents embodiments to modify the operation of a camera device, such as the generation and/or transmission of video data, in response to security events. In other words, in respond to a security event, the surveillance computing system proactively performs operations to make the most recent non-live video footage available as fast as possible.

In a first aspect, the camera device is instructed by the surveillance computing system to immediately finish the current data block that it is generating and to upload it to the video archiver in response to a security event. For example, when the surveillance computing system obtains a security event, such as a door forced open alarm from a door sensor, the surveillance computing system can transmit a configuration command to the camera device associated with the security event, such as to the camera recording footage of the door with the alarm. Prior to the security event occurring, the camera device is transmitting video data in data blocks with a large block size to a video archiver. The camera device responds to the configuration command by not adding any more video data to the current data block that it is generating and transmits the current data block. As such, the video archiver receives the current data block sooner than it would have if the camera device had continued to generate and transmit a larger data block and/or the video archiver processes the current data block faster than the larger data block, and thus the video archiver can make the video corresponding to the current data block available quicker compared to the larger data block.

The first aspect may further include transmitting a stream of images to the video archiver, rather than using data blocks, after the camera device finishes generating the current data block.

In a second aspect, the camera device is instructed by the surveillance computing system to temporarily change the block size to use smaller data blocks in response to a security event. Similar to the example above, when the surveillance computing system obtains a security event, the surveillance computing system can transmit a configuration command to the camera device. Prior to the security event occurring, the camera device is transmitting video data in data blocks with a large block size to a video archiver. The camera device responds to the configuration command by modifying the transmitting of the video data to use smaller data blocks. As such, the video archiver receives the smaller data block sooner than it would have if the camera device had continued to generate and transmit larger data blocks and/or the video archiver processes each smaller data block faster than each larger data block, and thus the video archiver can make the video corresponding to a given smaller data block available quicker compared to the larger data block.

The second aspect may be used in combination with the first aspect, such that the camera device immediately finishes generating a current data block and then continues to generate data blocks with a smaller block size compared to the larger block size it was previously generating the data blocks therewith. In some cases, the second aspect may only finish generating the current data block when the current size of the current data block is larger than the small block size that it has been instructed to use. In some cases, the second aspect may finish generating the current data block according to the larger block size when the current size of the current data block is within a small range of the larger block size.

In a third aspect, the camera device is instructed by the surveillance computing system to temporarily upload a separate stream of images to the video archiver that will be available right away. Following with the examples above, when the surveillance computing system obtains a security event, the surveillance computing system can transmit a configuration command to the camera device. Prior to the security event occurring, the camera device is transmitting video data in data blocks with a large block size to a video archiver. The camera device responds to the configuration command by modifying the transmitting of the video data by transmitting a separate stream of images to the video archiver. As such, the video archiver receives the stream of images sooner than it would have if the camera had continued to generate and transmit larger data blocks, and thus the video archiver can make the video corresponding to the image stream available quicker compared to large data block.

As such, in each of these aspects mentioned above, a user's computing device can request and display near live video of the camera device that would have otherwise been unavailable for retrieval from the video archiver if the camera device had continued to only generate and transmit larger data blocks.

To this end, the present disclosure provides methods, systems, and computer-readable media for providing near live video by a surveillance computing system, a camera device, a video archiver, or by any other suitable device and/or system.

According to at least one embodiment, there is disclosed a method for providing near live video by a surveillance computing system, the method comprising: obtaining, at the surveillance computing system, a security event; identifying, by the surveillance computing system, a camera device associated with the security event, the camera device transmitting video data comprising data blocks to a networked video archiver for storage; and transmitting, by the surveillance computing system, a configuration command to the camera device identified as associated with the security event, the configuration command causes the camera device to perform one or more operations including modifying the transmitting of the video data to allow for a computing device to display near live video of the camera device that would otherwise be unavailable for retrieval from the networked video archiver in absence of the modifying of the transmitting of the video data.

In some embodiments, the method further comprises receiving, at the surveillance computing system, a request for the near live video of the camera device from the computing device; and processing, by the surveillance computing system, the request for near live video and instructing the networked video archiver to transmit the near live video to the computing device such that the computing device displays the near live video.

In some embodiments, the camera device generates the data blocks of the video data according to a first set of block parameters prior to the obtaining of the security event. In some embodiments, the configuration command causes the camera device to modify the transmitting of the video data by generating the data blocks according to a second set of block parameters, wherein the data blocks generated according to the second set of block parameters are smaller than the data blocks generated according to the first set of block parameters. In some embodiments, the near live video requested by the computing device corresponds to video transmitted with data blocks generated according to the second set of block parameters from the camera device to the networked video archiver.

In some embodiments, the camera device generates the data blocks of the video data according to a first set of block parameters prior to the obtaining of the security event. In some embodiments, the configuration command causes the camera device to modify the transmitting of the video data by stopping to add data to a current data block being generated for transmission to the networked video archiver and by transmitting the current data block to the networked video archiver; and wherein the current data block transmitted by the camera device to the networked video archiver is smaller than the data blocks generated according to the first set of block parameters. In some embodiments, the configuration command further causes the camera device to modify the transmitting of the video data by generating the data blocks according to a second set of block parameters, wherein the data blocks generated according to the second set of block parameters are smaller than the data blocks generated according to the first set of block parameters. In some embodiments, the configuration command further causes the camera device to modify the transmitting of the video data by transmitting a video data stream of images to the networked video archiver. In some embodiments, the near live video requested by the computing device corresponds to video transmitted in the current data block from the camera device to the networked video archiver.

In some embodiments, the configuration command comprises at least one of a command to stop video data block transmission and a request for transmission of a video data stream of images to the networked video archiver. In some embodiments, the configuration command indicates to the camera device to transmit a video data stream of images to the networked video archiver, in addition to the transmitting of the video data comprising the data blocks. In some embodiments, the configuration command indicates to the camera device to transmit a video data stream of images to the networked video archiver, in addition to the transmitting of the video data comprising the data blocks; and wherein the near live video requested by the computing device corresponds to video transmitted in the video data stream of images transmitted by the camera device to the networked video archiver.

In some embodiments, the configuration command is a first configuration command. In some embodiments, the camera device generates the data blocks of the video data according to a first set of block parameters prior to receiving the first configuration command; and wherein the method further comprises transmitting, by the surveillance computing system, a second configuration command to the camera device identified as associated with the security event, the second configuration command causes the camera device to perform one or more operations including stopping the modifying of the transmitting of the video data and reverting to generating the data blocks of the video data according to the first set of block parameters.

According to at least one embodiment, there is disclosed a computing system for providing near live video, the computing system comprising: at least one processor; and at least one non-transitory computer-readable memory having stored thereon program instructions executable by the at least one processor for: obtaining a security event; identifying a camera device associated with the security event, the camera device transmitting video data comprising data blocks to a networked video archiver for storage; and transmitting a configuration command to the camera device identified as associated with the security event, the configuration command causes the camera device to perform one or more operations including modifying the transmitting of the video data to allow for a computing device to display near live video of the camera device that would otherwise be unavailable for retrieval from the networked video archiver in absence of the modifying of the transmitting of the video data.

In some embodiments, the program instructions are further executable by the at least one processor for: receiving a request for the near live video of the camera device from the computing device; and processing the request for near live video and instructing the networked video archiver to transmit the near live video to the computing device such that the computing device displays the near live video. In some embodiments, the configuration command is a first configuration command. In some embodiments, the camera device generates the data blocks of the video data according to a first set of block parameters prior to receiving the first configuration command. In some embodiments, the program instructions are further executable by the at least one processor for transmitting a second configuration command to the camera device identified as associated with the security event, the second configuration command causes the camera device to perform one or more operations including stopping the modifying of the transmitting of the video data and reverting to generating the data blocks of the video data according to the first set of block parameters.

According to at least one embodiment, there is disclosed a non-transitory computer-readable storage medium having stored thereon program instructions which, when executed, cause at least one processor to: obtain a security event; identify a camera device associated with the security event, the camera device transmitting video data comprising data blocks to a networked video archiver for storage; and transmit a configuration command to the camera device identified as associated with the security event, the configuration command causes the camera device to perform one or more operations including modifying the transmitting of the video data to allow for a computing device to display near live video of the camera device that would otherwise be unavailable for retrieval from the networked video archiver in absence of the modifying of the transmitting of the video data.

In some embodiments, the program instructions which, when executed, further cause the at least one processor to: receive a request for the near live video of the camera device from the computing device; and process the request for near live video and instruct the networked video archiver to transmit the near live video to the computing device such that the computing device displays the near live video. In some embodiments, the configuration command is a first configuration command; wherein the camera device generates the data blocks of the video data according to a first set of block parameters prior to receiving the first configuration command; and wherein the program instructions which, when executed, further cause the at least one processor to transmit a second configuration command to the camera device identified as associated with the security event, the second configuration command causes the camera device to perform one or more operations including stopping the modifying of the transmitting of the video data and reverting to generating the data blocks of the video data according to the first set of block parameters.

Any of the above features may be used together in any suitable combination.

BRIEF DESCRIPTION OF THE FIGURES

Reference is now made to the accompanying figures in which:

FIG. 4A is a diagram illustrating a first specific and non-limiting example of a security event exemplifying a door forced open event, in accordance with one or more embodiments;

FIG. 4B is a diagram illustrating a second specific and non-limiting example of a security event exemplifying a camera event, in accordance with one or more embodiments;

FIG. 4C is a diagram illustrating a third specific and non-limiting example of a security event exemplifying a camera appliance event, in accordance with one or more embodiments;

FIG. 4D is a diagram illustrating a fourth specific and non-limiting example of a security event exemplifying an alarm event, in accordance with one or more embodiments;

FIG. 5A is a diagram illustrating a first specific and non-limiting example of a database table in which camera identifiers are associated with door identifiers, in accordance with one or more embodiments;

FIG. 5B is a diagram illustrating a second specific and non-limiting example of a database table in which camera identifiers are associated with alarm identifiers, in accordance with one or more embodiments;

FIG. 5C is a diagram illustrating a third specific and non-limiting example of a database table in which camera identifiers are associated with camera appliance identifiers, and there is also illustrated the database table of FIG. 5B, in accordance with one or more embodiments;

FIG. 5D is a diagram illustrating a fourth specific and non-limiting example of a database table in which alarm identifiers are associated with camera identifiers and corresponding camera appliance identifiers, in accordance with one or more embodiments;

It will be noted that throughout the appended drawings, like features are identified by like reference numerals.

DETAILED DESCRIPTION

Figure 1:
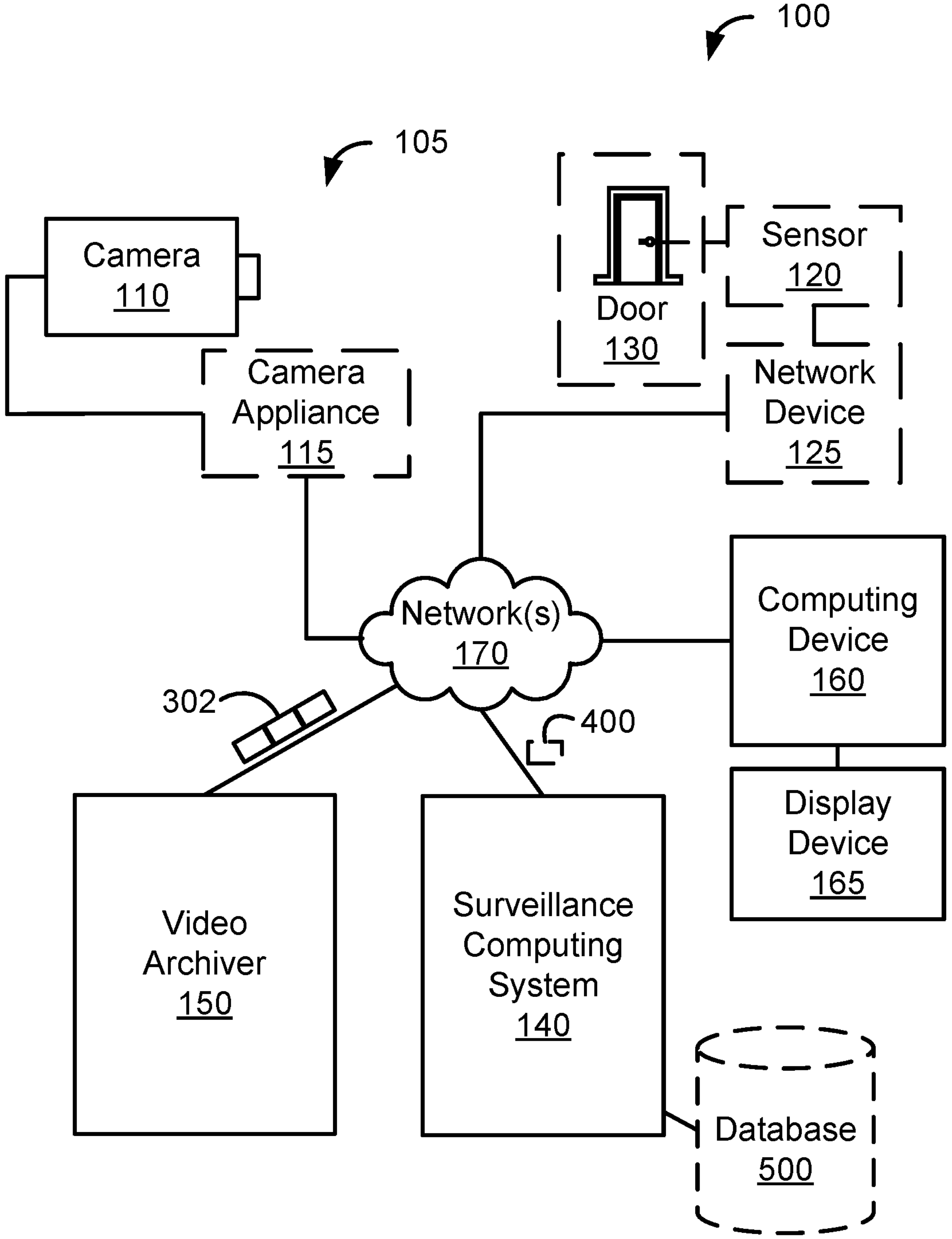
FIG. 1 is a block diagram of an example security system for providing near live video of a camera device to a computing device by a surveillance computing system, in accordance with one or more embodiments.

With reference to FIG. 1, there is illustrated an example security system 100 for providing near live video of a camera device 105 to a computing device 160 by a surveillance computing system 140. In this example, the camera device 105 refers to a camera 110 or refers to a camera appliance 115 connected to a camera 110. The camera device 105 is configured to be able to transmit video data 302 in data blocks to a video archiver 150 for storage. The surveillance computing system 140 is configured to be able to transmit a configuration command to the camera device 105 to cause the camera device 105 to modify the transmission of the video data 302 to allow for the computing device 160 to be able to display the near live video of the camera device 105. The abovementioned and other features are further described herein.

The surveillance computing system 140 may include one or more servers. In some embodiments, the surveillance computing system 140 includes an on-premises server. In some embodiments, the surveillance computing system 140 includes cloud computing infrastructure. The surveillance computing system 140 may be a hybrid on-premises and cloud computing system. The surveillance computing system 140 may include at least one on-premises server and cloud computing infrastructure (e.g., one or more servers of cloud computing infrastructure). The surveillance computing system 140 may include any suitable computing device(s) and/or system(s). The surveillance computing system 140 may include a video management system (VMS). The surveillance computing system 140 may provide an interface and/or communication mechanism to allow for the computing device 160 to view live video, archived video and/or near live video on a display device 165. The surveillance computing system 140 may be configured to receive security events, such as a security event 400, and accordingly respond to each security event 400. Each security event 400 may include any suitable event, such as, an alarm event (e.g., a door forced open alarm event, a smoke or other gas detection alarm event, a motion detection event, for example, from a motion sensor, a sound detection event, an access control event, for example, an access denied event, etc.), a camera event (e.g., a motion detection event, a sound detection event, etc.) and/or a camera appliance event (e.g., a motion detection event, a sound detection event, etc.). The surveillance computing system 140 may alert a user via the computing device 160 of the security event 400. The surveillance computing system 140 may communicate with the camera device 105 to adjust the transmission of the video data 302 in response to the security event 400. More specifically, the surveillance computing system 140 may communicate with the camera device 105 to cause the camera device 105 to modify the transmission of the video data 302 in order to allow for the computing device 160 to display near live video of the camera device 105 that would otherwise be unavailable for retrieval from the video archiver 150 in the absence of any modification of the transmitting of the video data 302.

The term "archived video" refers to previously recorded video that has been stored in any suitable storage device, memory, medium and/or system. Archived video of the camera device 105 may be provided to the computing device 160 for display from the video archiver 150 storing the archived video.

The term "live video" refers to video provided in real-time, or effectively in real-time, from a time of recording of the video. Live video may be provided to the computing device 160 for display from the camera device 105, for example, via cloud services of cloud computing infrastructure.

The term "near live video" refers to video provided with a time difference between a time of recording of the video and a current time, where the time difference is less than a primary duration of a data block generated according to primary settings of the camera device 105. Video that is "near live video" excludes "live video". The "near live video" may be referred to as "recent non-live video".

For example, the primary settings may include a block video duration parameter set with a primary video duration, and in this example, the primary duration of a data block generated according to primary settings is the primary video duration. By way of another example, the primary settings may include a block video data size parameter set with a primary video data size, and in this example, the primary duration of a data block generated according to primary settings is a maximum amount of video time that a data block generated with the primary video data size can have. The primary settings may include at least one of a block video duration parameter set with a primary video duration and a block video data size parameter set with a primary video data size. The primary duration of a data block generated according to primary settings may depend on multiple parameters. For example, the primary settings may include a block video duration parameter set with a primary video duration and a block video data size parameter set with a primary video data size, and the camera device may generate each data block until the primary block data size is reached or until the primary block time duration is reached; in this example, the primary duration is the shorter of the primary block time duration and the maximum amount of video time that any data block generated with the primary video data size can have. The settings and the block parameters are also described elsewhere in this document.

The video archiver 150 may include one or more servers. In some embodiments, the video archiver 150 includes an on-premises server. In some embodiments, the video archiver 150 includes cloud computing infrastructure. The video archiver 150 may be a hybrid on-premises and cloud computing system. The video archiver 150 may include at least one on-premises server and cloud computing infrastructure (e.g., one or more servers of the cloud computing infrastructure). The video archiver 150 may include any suitable computing device(s) and/or system(s). The video archiver 150 may include a network video recorder that stores video data. The video archiver 150 may include any suitable memory and/or storage devices for the storage of video data. The video archiver 150 receives data blocks of video data 302 from the camera device 105 and processes the data blocks for storage. The video archiver 150 may be separate from the surveillance computing system 140 or may be the same server(s) and/or implemented on the same cloud computing infrastructure of the surveillance computing system 140. The video archiver 150 may be referred to as a "networked video archiver", as it may be connected to one or more networks 170 and may receive video data over the one or more networks 170.

The cloud computing infrastructure may include any suitable hardware and software elements for enabling cloud computing and/or for providing cloud services. The cloud computing infrastructure may include one or more servers, one or more computers, system and/or device, one or more network devices, memory, one or more storage devices, one or more data lakes, one or more data pools, one or more data systems and/or one or more data clusters, and/or any other suitable hardware and/or software elements. The cloud computing infrastructure may include an interface for users to access virtual resources. The virtual resources may mirror a physical infrastructure, with components like servers, network devices, memory and storage.

In some embodiments, the camera device 105 includes the camera 110. The camera 110 may be any suitable camera for capturing images and generating video comprising a plurality of image frames. The camera 110 may include an Internet protocol (IP) video camera. The camera 110 may be configured to generate data blocks of video data 302 in an encoding format (e.g., H.265, H.264, MPEG, or any other suitable encoding format). The camera 110 may communicate with the video archiver 150 over one or more networks 170. The camera 110 may be configured to transmit the data blocks of video data 302 to the video archiver 150 over the network(s) 170. Each data block of the video data 302 corresponds to a plurality of image frames captured by the camera 110. For example, one minute of image frames may be stored in a particular data block. The number of image frames in the one minute of image frames may vary depending on the settings of the camera 105, such as, for example, the frame rate of capturing the images. The number of image frames in any given data block may vary. The camera 110 may be an IP security camera, an IP camera for surveillance, and/or any other suitable camera. The video captured by the camera 110 may be referred to as security video footage. While only one camera 110 is shown in FIG. 1, there could be more than one camera transmitting video data to the video archiver 150.

In some embodiments, the camera 110 is not configured to transmit video data in data blocks to the video archiver 150, and the camera appliance 115 may be used, in general, as a bridge between one or more cameras, such as the camera 110, and the video archiver 150. For example, the camera 110 might not be an IP video camera and/or might not have the functionality to generate data blocks of video data. In some embodiments, the camera 110 is an analogue camera, such as, for example, a closed-circuit television (CCTV) camera. In some embodiments, the camera 110 may be configured to transmit video data in data blocks and is connected to the camera appliance 115 to transmit video data in data blocks to the video archiver 150.

In some embodiments, the camera device 105 includes the camera appliance 115. The camera appliance 115 may be connected to at least one camera, such as the camera 110. In some embodiments, the camera 110 may be directly connected to the camera appliance 115 or may be connected to the camera appliance 115 over one or more networks, such as the network(s) 170 or a separate network. The camera appliance 115 may receive video from the camera 110 and may generate the data blocks of video data 302 that are transmitted to the video archiver 150 from the video that the camera appliance 115 receives from the camera 110. For example, the camera 110 may transmit video data in the form of a video data stream of images to the camera appliance 115, and the camera appliance 115 may then generate the data blocks of video data 302 from the stream of images. The camera 110 may transmit analogue video to the camera appliance 115, and the camera appliance 115 may then generate the data blocks of video data 302 from the analogue video. The camera appliance 115 may be configured to generate data blocks of video data 302 in an encoding format (e.g., H.265, H.264, MPEG, or any other suitable encoding format). The camera appliance 115 may be configured to transmit the data blocks of video data 302 to the video archiver 150. In some embodiments, the camera appliance 115 may include the Synergis™ Cloud Link hardware appliance provided by Genetec Inc. While only one camera appliance 115 is shown in FIG. 1, there could be more than one camera appliance transmitting video data to the video archiver 150, where each one of the camera appliances is connected to one or more cameras.

The camera device 105 generates the data blocks according to settings of the camera device 105. The settings of the camera device 105 may be set and/or adjusted by sending one or more configuration commands to the camera device 105. The settings may include one or more parameter. For example, the settings for the video encoding format may include one or more video encoding parameters (e.g., one or more of: a video encoding format, frame rate, bitrate, compression ratio, and/or any other suitable encoding parameters), the settings for connecting to the video archiver 150 may include one or more connection parameters (e.g., one or more of: an IP address, port number, authentication information, etc.), settings for generating the data blocks may include one or more block parameters (e.g., one or more of: a block video duration parameter having a value set to a particular time duration, a block video data size parameter having a value set to a particular data size, and/or any other suitable parameter). In some embodiments, the one or more block parameters may include one or more of the video encoding parameters. The camera 110 and/or the camera appliance 115 may generates data blocks according to any of the settings, which may be set and/or adjusted by sending one or more configuration commands to the camera 110 and/or the camera appliance 115.

The computing device 160 may include any suitable computer such as a workstation, a portable computer, a tablet computer, a smartphone, a smart watch, smart glasses, or any other suitable device. A user may use the computing device 160 to connect to the surveillance computing system 140 to request to view live video, near live video and/or archived video, and/or to receive any security events (e.g., a door forced open alarm, motion events, etc.). The computing device 160 may provide a user interface for interacting and/or controlling the surveillance computing system 140. The computing device 160 may function largely as a client, e.g., using a web browser or client application. In some embodiments, the surveillance computing system 140 may provide a user interface for interacting therewith, in which case the computing device 160 may be omitted. By way of an example, the computing device 160 is a workstation running the Genetec™ Security Desk application to connect to the surveillance computing system 140 implemented as an on-premises server running the Genetec™ Security Center unified security platform provided by the Applicant. By way of another example, a user may use a web browser and/or a client application of the computing device 160 to connect to the surveillance computing system 140 implemented with cloud computing infrastructure running Genetec™ Security Center SaaS provided by the Applicant. A display device 165 may be connected to the computing device 160. In some embodiments, the computing device 160 may comprise the display device 165. The display device 165 may be a cathode ray tube display device, a light emitting diode (LED) display device, an organic light-emitting diode (OLED) display device, a liquid crystal display (LCD) display device, a touch screen, or any other suitable display device. In embodiments where the computing device 160 is omitted, the display device 165 may be connected to surveillance computing system 140 or the surveillance computing system 140 may comprise the display device 165. While only one computing device 160 is shown in FIG. 1, in some embodiments, there may be multiple computing devices that are configured to connect to the surveillance computing system 140 to request to view live video, near live video and/or archived video, and/or to receive any security events.

In some embodiments, the security system 100 includes, one or more sensors, such as a sensor 120. For example, as illustrated, the sensor 120 may be used to monitor a door 130. The sensor 120 may include any suitable external device, system, standalone sensor or combination thereof. The sensor 120 may generate the security event 400 (e.g., a door forced open alarm) that it transmits to the surveillance computing system 140. In some embodiments, the sensor 120 transmits data to the surveillance computing system 140, which in turn generates the security event 400. In some embodiments, the sensor 120 transmits data to a network device 125, which in turn generates the security event 400. The network device 125 may include a router, an access controller, or any suitable network device, for example, that allows for the sensor 120 to convey data to the surveillance computing system 140 over the network(s) 170. For example, the network device 125 may include a door controller, which may be a computer having interfaces for communicating with at least one card reader (not illustrated) for granting or denying access through the door 130. In some embodiments, the network device 125 may be the camera appliance 115, and the sensor 120 may be connected to the camera appliance 115 in order to communicate with the surveillance computing system 140 over the network(s) 170. A separate sensor 120 is optional, as security events (e.g., camera events, camera appliance events, motion detected events, etc.) may be generated by the camera device 105 (e.g., by the camera 110 and/or the camera appliance 115). Similarly, the network device 125 and the door 130 are optional. While only one sensor 120 is shown in FIG. 1, there could be more than one sensor, where each one of the sensors may include one or more door sensors, motion detectors, smoke or other gas sensors/detectors, microphones, access control devices, access card readers, door locks, cameras, camera appliances, and other sensors that may each be generating and/or transmitting data, for example, security events, or data indicative of security events, to the surveillance computing system 140 over the one or more networks 170.

Any communication between the surveillance computing system 140, the video archiver 150, the computing device 160, the camera device 105, the camera 110, the camera appliance 115, the network device 125, the sensor 120 and/or any other suitable device(s), may be over one or more networks 170, generally referred to herein as the network(s) 170. The network(s) 170 may comprise one or more public networks (e.g., the Internet) and/or one or more private networks. The network(s) 170 may comprise one or more of a personal area network (PAN), local area network (LAN), mesh network, metropolitan area network (MAN), wide area network (WAN), wireless network, Wi-Fi network, Bluetooth network, cellular network and/or any other suitable computer network(s).

Figure 2:
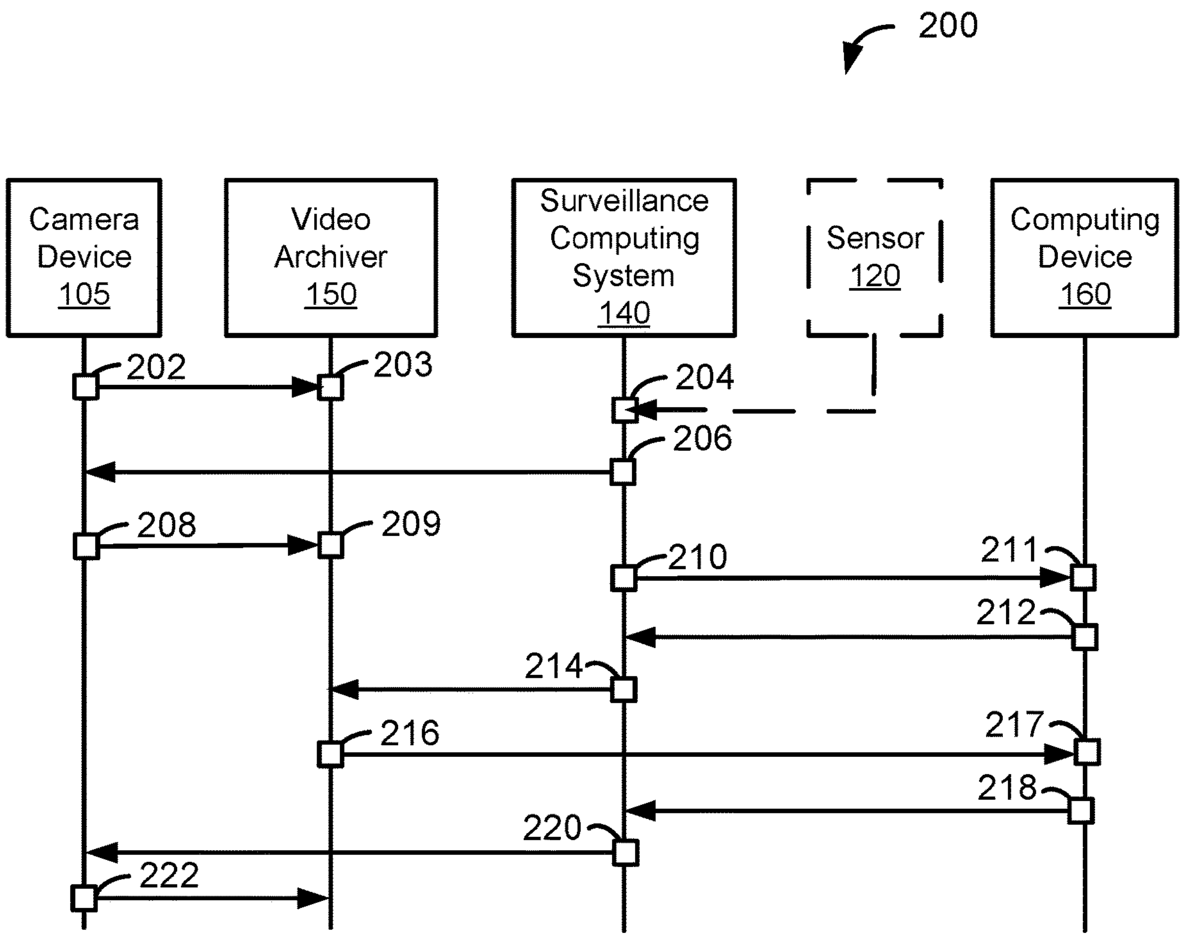
FIG. 2 is a diagram illustrating an example process for providing near live video of the camera device to the computing device by the surveillance computing system, in accordance with one or more embodiments.

With additional reference to FIG. 2, a specific and non-limiting example of a process 200 for providing near live video of the camera device 105 to the computing device 160 by the surveillance computing system 140 is illustrated.

Figure 3A:
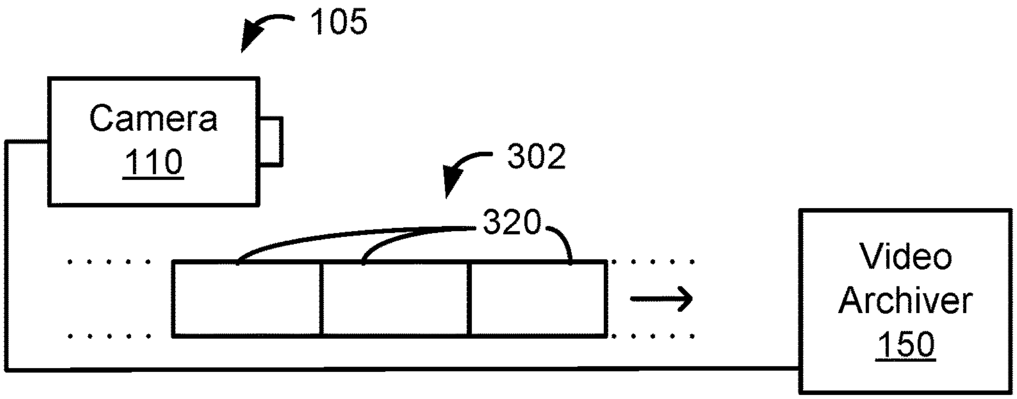
FIG. 3A is a diagram illustrating a camera providing video data including data blocks to a video archiver, in accordance with one or more embodiments.
Figure 3B:
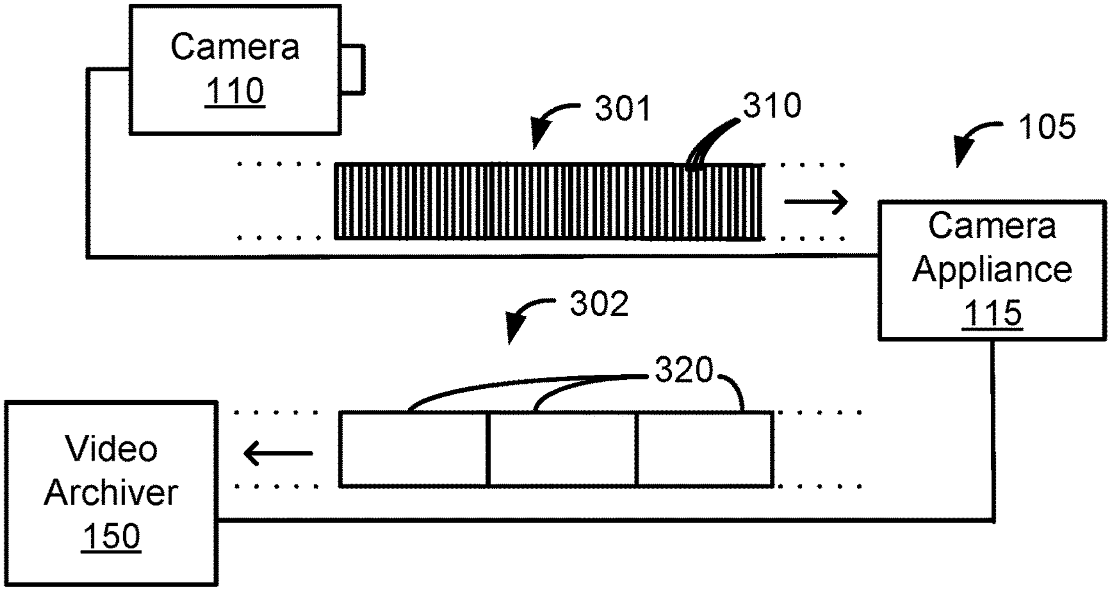
FIG. 3B is a diagram illustrating a camera appliance providing video data including data blocks to a video archiver, in accordance with one or more embodiments.

At step 202, the camera device 105 transmits video data 302 in data blocks over the network(s) 170 to the video archiver 150 for storage. In some embodiments, the camera device 105 refers to the camera 110. With additional reference to FIG. 3A, in this example, the camera device 105 is the camera 110, and the camera 110 transmits video data 302 in data blocks 320 to the video archiver 150. In some embodiments, the camera device 105 refers to the camera appliance 115. With additional reference to FIG. 3B, in this example, the camera device 105 is the camera appliance 115, and the camera 110 transmits video as an image stream 301 of image frames 310 to the camera appliance 115, the camera appliance 115 generates the video data 302 comprising data blocks 320 from the image stream 301, and the camera appliance 115 transmits the video data 302 to the video archiver 150.

Figure 3C:
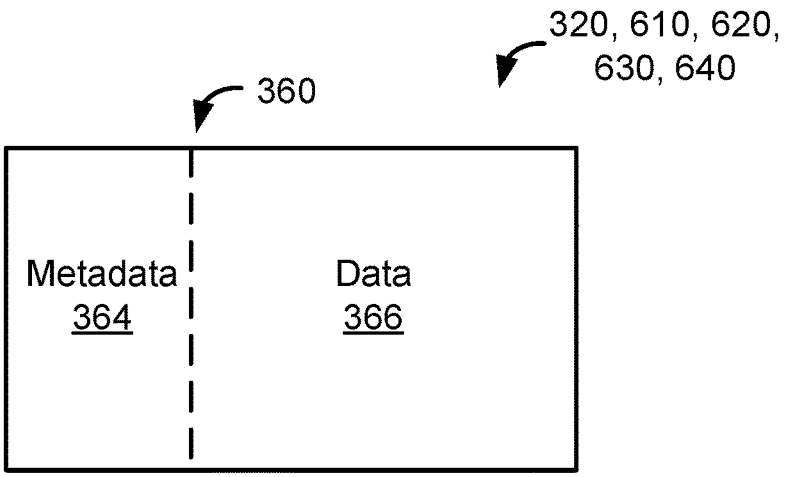
FIG. 3C is a diagram illustrating a block format for data blocks, in accordance with one or more embodiments.

The data blocks 320 of the video data 302 may be generating by the camera device 105, such as the camera 110 and/or camera appliance 115, in a block format. With additional reference to FIG. 3C, an example of a block format 360 is illustrated. In this example, the block format 360 specifies that data blocks, such as data blocks 320, are each to be generated to comprise metadata 364 and data 366. In other words, in this example, each data block 320 comprises metadata 364 and data 366. The data 366 of each data block may be adjusted and/or set at various data sizes and typically includes video data. The metadata 364 of each data block may comprise any suitable metadata. The metadata 364 may be stored as key-value pairs. In some embodiments, the block format 360 may specify the types of metadata that may be included in the metadata 364.

The data blocks 320 of the video data 302 may be generating by the camera device 105 (e.g., the camera 110 or camera appliance 115), in accordance with a set of block parameters. A set of block parameters may include one or more block parameters. The set of block parameters may be stored in the settings of the camera device 105, such as in the settings of the camera 110 and/or the settings of camera appliance 115. In general, the set of block parameters may specify how each data block is to be generated, for example, in the block format 360. The block format 360 and/or the set of block parameters may depend on practical implementation.

The set of block parameters may include one or more parameters that indicate certain metadata is to be provided in the metadata 364 of each data block. The metadata 364 may include any one or more of the following: a camera device identifier of the camera 110 or the camera appliance 115, a camera identifier of the camera 110 capturing the video, a camera appliance identifier of the camera appliance 115, a data block identifier for identifying data blocks from each other, a storage identifier for the video archiver 150, a start time timestamp and/or end time timestamp for the video, a video duration time, an identifier of the codec used to generated the video data, resolution of the video data, frame rate of the video data, bit rate of the video data, information to sequence with other data blocks, and/or any other suitable metadata.

The set of block parameters may include one or more parameters to control a size of each data block (e.g., to control the data size of the data 366 and/or to control the duration of the video stored in the data 366). The set of block parameters may include a block video data size parameter for each data block, for example, such as the data blocks 320. For example, the value of the block video data size parameter may be set in bytes, kilobytes, megabytes, etc. The block video data size parameter may indicate that data blocks should be generated such that the size of video data of each data block corresponds to the block video data size parameter. In some embodiments, the block video data size parameter is a maximum data size. Accordingly, in some embodiments, the block video data size parameter indicates that data blocks should be generated such that the size of video data of each data block is less than or equal to the block video data size parameter (i.e., does not exceed the block video data size parameter).

The set of block parameters may include a block video duration parameter for the duration of the video of each data block. For example, the value of the block video duration parameter may be set in milliseconds, seconds, minutes, etc. The block video duration parameter may indicate that data blocks should be generated such that the duration of video of each data block corresponds to the value of the block video duration parameter. In some embodiments, the block video duration parameter is a maximum time duration. Accordingly, in some embodiments, the block video duration parameter indicates that data blocks should be generated such that the duration of video of each data block is less than or equal to the block video duration parameter (i.e., does not exceed the block video duration parameter).

In some embodiments, the set of block parameters includes the block video data size parameter and the block video duration parameter. Accordingly, in some embodiments, the data blocks 320 may be generated such that a size of a given one of the data blocks 320 varies depending on which block parameter is reached first while generating each data block 320 (e.g., if a size of the data 366 first reaches the value of the block video data size parameter or if a duration of video forming the data 366 first reaches the value of the block video duration parameter). As such, the data blocks 320 may vary in data size between each other, as some data blocks may reach the block data size parameter while other data blocks may reach the block video duration parameter, which may result in the data blocks 320 having a non-constant data size between each other.

At this stage of operation of the camera device 105 at step 202, the set of block parameters used to generate the data blocks 320 of the video data 302 may be referred to as a first set of block parameters. The first set of block parameters may be referred to as a "primary set of block parameters", a "default set of block parameters", or an "initial set of block parameters".

When the camera device 105 operates with primary settings, such as, for example, when the settings of the camera device 105 are set to a primary set of block parameters, it may be said that the camera device 105 is operating in a primary mode of operation. In some embodiments, the primary settings are default settings. In some embodiments, the primary mode of operation is a default mode of operation. The primary set of block parameters may correspond to the first set of block parameters. The primary set of block parameters may include a block video data size parameter set to a value corresponding to a primary video data size and/or a block video duration parameter set to a value corresponding to a primary video duration. The primary settings may be set with the primary set of block parameters to address a balance between the wanted availability of video and the cost of archiving it. For instance, the larger the block video data size is in size and the longer the block video duration is in time, the cheaper it is to archive the video; however, the larger the block video data size is in size and the longer the block video duration is in time, the time delay before the video is available is longer. In general terms, the primary settings may be set to generate large data blocks to keep archiving costs reasonable, such as, for example, in one-minute time duration data blocks. However, if the primary video duration is one minute (i.e., the value of the block video duration parameter is set to one minute), then video generated with the primary settings would not be available at the video archiver 150 for at least one minute, as that is the time that it takes the camera device 105 to accumulate the data to generate a data block. In other words, in this example, the primary duration to generate a data block according to this example's primary settings is one minute, and near live video would correspond to video with a time difference between a time of recording of the video and a current time, where the time difference is less than one minute.

The primary settings may vary depending on implementation. In some embodiments, the block video duration parameter is set to a primary video duration value of 15 seconds, and near live video correspond to video with a time difference between a time of recording of the video and a current time of less than 15 seconds. In some embodiments, the block video duration parameter is set to a primary video duration value of 30 seconds, and near live video correspond to video with a time difference between a time of recording of the video and a current time of less than 30 seconds. In some embodiments, the block video duration parameter is set to a primary video duration value of 45 seconds, and near live video correspond to video with a time difference between a time of recording of the video and a current time of less than 45 seconds. In some embodiments, the block video duration parameter is set to a primary video duration value of 60 seconds, and near live video correspond to video with a time difference between a time of recording of the video and a current time of less than 60 seconds. In some embodiments, the block video duration parameter is set to a primary video duration value of 2 minutes, and near live video correspond to video with a time difference between a time of recording of the video and a current time of less than 2 minutes. Any other suitable value for the block video duration parameter may be used.

Referring back to FIG. 2, at step 203, the video archiver 150 receives each data block 320 and processes each data block 320 for storage. The processing of each data block 320 may depend on the video archiver 150 used in implementation. In some embodiments, the video archiver 150 includes Azure Cloud Storage provided by Microsoft™. In some embodiments, the video archiver 150 includes Amazon Web Services (AWS) cloud storage provided by Amazon™. In some embodiments, the video archiver 150 includes Google Cloud Platform (GCP) provided by Google™. The video archiver 150 may includes any other suitable cloud storage system. The video archiver 150 may include any suitable object storage system.

In some embodiments, the camera device 105 (e.g., the camera 110 or the camera appliance 115) may transmit a request to the video archiver 150 to reserve a block of data of a particular data size (which may be referred to as "object"), and in response the video archiver 150 may transmit an identifier to the camera device 105, which is generally referred to as an object identifier. The particular data size included in the request made by the camera device 105 may correspond to the block video data size parameter set at the camera device 105. The camera device 105 may include the object identifier received from the video archiver 150 in a particular data block 320 that it is generating at step 202, which may be included in the metadata 364. In some embodiments, the block format 360 includes an object identifier portion (not illustrated in FIG. 3C) for storing one or more object identifiers, and which may be separate from the metadata 364. The camera device 105 may generate the particular data block 320 by adding video data to the data 366 of the particular data block 320, and adds metadata in the key-value pair format, for example, adds an identifier of the camera device 105, a start time timestamps and a duration of the video to the metadata 364. The camera device 105 may then transmit the particular data block 320 to video archiver 150. The video archiver processes the particular data block 320 and stores it to storage based on the object identifier provided therein.

In some embodiments, the camera device 105 generate a particular data block 320 by adding video data and adds metadata without requesting an object identifier from the network video archiver 150. In some embodiments, the camera device 105 transmits the particular data block 320 to video archiver 150, which processes it for storage in association with an object identifier and return the object identifier to the camera device 105. In some embodiments, the camera device 105 generates the object identifier, includes it in the particular data block 320 and transmits the particular data block 320 to the video archiver 150 for storage. The storage of the data blocks 320 at the video archiver 150 may vary.

Depending on the data size of the particular data block 320 there may be a block processing time or a latency that corresponds to an amount of time from the time the video archiver 150 receives the particular data block 320 till the video of the particular data block 320 is retrievable from the video archiver 150 by the computing device 160. When the data blocks are generated according to the first set of block parameters, there may be a primary processing time.

At step 204, the surveillance computing system 140 obtains the security event 400. The security event 400 may be received from the sensor 120 (or from the networked device 125 connected to the sensor 120). The security event 400 may be generated at the surveillance computing system 140 based on data indicative of the security event 400 that it receives from the sensor 120, which may be transmitted via the networked device 125 connected to the sensor 120. The security event 400 may be received from the camera device 105, such as a motion event detected by the camera device 105 (e.g., a motion event detected by the camera 110, or a motion event detected by the camera appliance 115).

The security event 400, in this example, includes a grouping of data indicative of an occurrence of an event pertaining to a security issue. The security event 400 may be a data object, a data item, a data structure or any other suitable grouping of data. The security event 400 may comprise data, such as any one or more of the following: a timestamp indicative of a time of occurrence of the security event 400; an identifier indicative of a source (e.g., a device, sensor, and/or object, etc.) associated with the occurrence of the security event (e.g., a sensor identifier, an alarm identifier, a door identifier, a network device identifier, a camera identifier, a camera appliance identifier, an access control device identifier, etc.), and/or an event type indicative of a type of the security event (e.g., a door forced open event, a motion detection event, an alarm event, etc.). The security event 400 may comprise any other suitable data, for example, the security event 400 may comprise any one or more of the following: a location identifier, a door controller identifier, a control unit identifier, or any other suitable identifier and/or information.

With reference to FIG. 4A, there is illustrated a first specific and non-limiting example of the security event 400, which in this example is a door forced open event 401. In this example, the door forced open event 401 is from a door lock sensor 120 of the door 130 and comprises a timestamp 411 of the occurrence of the door forced open event 401, a door identifier 412 of the door 130, and an event type 413 of door forced open. The door forced open event 401 may comprise any other suitable information.

With reference to FIG. 4B, there is illustrated a second specific and non-limiting example of the security event 400, which in this example is a camera event 402, and in particular is a motion detected event. In this example, the camera event 402 is from the camera 110 and comprises a timestamp 421 of the occurrence of the motion detected event, a camera identifier 422 of the camera 110, and an event type 423 of motion detected. The camera event 402 may comprise any other suitable information.

With reference to FIG. 4C, there is illustrated a third specific and non-limiting example of the security event 400, which in this example is a camera appliance event 403, and in particular is a motion detected event. In this example, the camera appliance event 403 is from the camera appliance 115 and comprises a timestamp 431 of the occurrence of the motion detected event, a camera identifier 432 of the camera 110 connected to the camera appliance 115, a camera appliance identifier 433 of the camera appliance 115, and an event type 423 of motion detected. The motion may be detected by either the camera 110 or the camera appliance 115. The camera appliance event 403 may comprise any other suitable information.

With reference to FIG. 4D, there is illustrated a fourth specific and non-limiting example of the security event 400, which in this example is an alarm event 404. In this example, the alarm event 404 is from any suitable sensor, device, and/or system configured to generate alarm events, and comprises a timestamp 441 of the occurrence of the alarm event 404, an alarm identifier 442 (e.g., an identifier of an alarm, sensor, and/or device, etc.), and an event type 443 of alarm (e.g., the alarm may be any of the following: door forced open, smoke or other gas detected, motion detection, sound detection, or any other suitable alarm). The alarm event 404 may comprise any other suitable information. The alarm event 404 may correspond to a door forced open event, a smoke or other gas detection event, a motion detection event, for example, from a motion sensor, a sound detection event, an access control event, for example, an access denied event, or any other suitable event.

The security event 400 may vary from the examples provided. In particular, the door forced open event 401, the camera event 402, the camera appliance event 403, and alarm event 404 may vary from the examples provided. The security event 400 may vary depending on practical applications, as it may be customized depending on the implemented environment.

Referring back to FIG. 2, at step 206, the surveillance computing system 140 identifies the camera device 105 associated with the security event 400 and then transmits, over the network(s) 170, a configuration command to the identified camera device 105. The security event 400 may be associated with at least one camera device, as there may be records that indicates that security events from given sensors, devices, and/or systems have corresponding camera devices (e.g., cameras and/or camera appliances). The configuration command, in general, instructs the camera device 105 to change how it generates and transmits data to the video archiver 150.

The surveillance computing system 140 may comprise a database 500 or may access a database 500 (as shown in FIG. 1) that comprises one or more database tables. The database tables in the database 500 may include a camera device database table that associates camera device identifiers (e.g., camera identifiers and/or camera appliance identifiers) with identifiers of sensors, devices, and/or systems. The databases tables may be searched by the surveillance computing system to identify the camera device 105 (e.g., the camera 110 and/or the camera appliance 115) from the security event 400. In general, an identifier from the security event 400 may be compared to one or more database tables to obtain an identifier of the camera device 105 such that the surveillance computing system 140 is able to communicate with the identified camera device 105 in order to send the configuration command to the identified camera device 105.

With reference to FIG. 5A, there is illustrated a first specific and non-limiting example of a database table 501, which in this example is for associating camera identifiers 511 with door identifiers 512. The database table 501 includes a plurality of records 515, where each record associates one or more camera identifiers 511 with one or more door identifiers 512. In this example, the camera 110 is recording footage of the door 130, and the camera device database table 501 include a record 516 that associates the camera device identifier 511 of the camera 110 with the door identifier 512 of the door 130. For example, if the surveillance computing system 140 receives the door forced open event 401 of FIG. 4A, the door identifier 412 of "D1001" can be obtained for the event 401 and compared to the database table 501 to find the record 516 with the corresponding door identifier 512 of "D1001". In this example, the record 516 with the door identifier 512 of "D1001 is associated with the camera identifier 511 of "C0003", which allows the surveillance computing system 140 to identify the camera, which in this example is camera 110, and then the surveillance computing system 140 can transmit the configuration command to the identified camera 110 having the camera identifier "C0003".

In some embodiments, the surveillance computing system 140 identifies the camera device 105 associated with the security event 400 from the security event 400. For example, if the surveillance computing system 140 receives the camera event 402 of FIG. 4B the camera identifier 422 of "C0003" can be obtained for the event 402 and then the surveillance computing system 140 can transmit the configuration command to the identified camera 110 with the camera identifier "C0003". By way of another example, if the surveillance computing system 140 receives the camera device event 403 of FIG. 4C, the camera identifier 432 of "C0003" and the camera appliance identifier 433 of "CA001" can be obtained for the event 403 and then the surveillance computing system 140 can transmit the configuration command to the identified camera appliance 115 having the camera appliance identifier "CA001" and can further specify in the confirmation command that the corresponding camera is camera 110 with the camera identifier "C0003". Accordingly, in some embodiments, such as when the security event 400 comprises an identifier of the camera device 105 (e.g., an identifier of the camera 110 and/or an identifier of the camera appliance 115), the database 500 and any database tables may be omitted or may not be used.

With reference to FIG. 5B, there is illustrated a second specific and non-limiting example of a database table 502, which in this example is for associating camera identifiers 521 with alarm identifiers 522. The database table 502 includes a plurality of records 525, where each record associates one or more camera identifiers 521 with one or more alarm identifiers 522. In this example, the camera 110 is recording footage of a building monitored with smoke detectors, and the camera device database table 502 include a record 526 that associates the camera identifier 521 of the camera 110 with the identifier of an alarm, which in this example is of a smoke detected alarm. For example, if the surveillance computing system 140 receives the alarm event 404 of FIG. 4D, the alarm identifier 442 of "A0004" can be obtained for the event 404 and compared to the database table 502 to find the record 526 with the corresponding alarm identifier 522 of "A0004". In this example, the record 526 with the alarm identifier 522 of "A0004 is associated with the camera identifier 521 of "C0003", which, allows the surveillance computing system 140 to identify the camera, which in this example is the camera 110, and then the surveillance computing system 140 can transmit the configuration command to the identified camera 110 having the camera identifier "C0003".

With reference to FIG. 5C, there is illustrated a third specific and non-limiting example of a database table 503, which in this example is for associating camera identifiers 541 and camera appliance identifiers 542, and there is also illustrated the database table 502 of FIG. 5B. The database table 503 includes a plurality of records 535, where each record associations one or more camera identifiers 531 with appliance identifiers 532. For instance, if the camera device 105 is the camera appliance 115, and alarm identifiers 522 are associated with camera identifiers 521, but not camera appliance identifiers, then the database table 503 may be used to identifier a camera appliance identifier from a particular camera identifier. For example, if the surveillance computing system 140 receives the alarm event 404 of FIG. 4D, the alarm identifier 442 of "A0004" can be obtained for the event 404 and compared to the database table 502 to find the record 526 with the corresponding alarm identifier 522 of "A0004". Then, in this example, the record 526 with the alarm identifier 522 of "A0004 is associated with the camera identifier 521 of "C0003", which, allows the surveillance computing system 140 to compare the camera identifier 521 of "C0003" to the database table 503 associating camera identifiers 531 and camera appliance identifiers 532 to find the record 536 with the corresponding camera appliance identifier 532 of "CA001" for the camera appliance 115. Then, in this example, the surveillance computing system 140 can transmit the configuration command to the identified camera appliance, which in this example is the camera appliance 115 having the camera appliance identifier "CA001".

With reference to FIG. 5D, there is illustrated a fourth specific and non-limiting example of a database table 504, which in this example is for associating with alarm identifiers 543 to camera identifiers 541 with corresponding camera appliance identifiers 542. The database table 504 includes a plurality of records 545, where each record associates one or more alarm identifiers 543 with one or more camera identifiers 541 and corresponding appliance identifiers 542. For example, if the surveillance computing system 140 receives the alarm event 404 of FIG. 4D, the alarm identifier 442 of "A0004" can be obtained for the event 404 and compared to the database table 504 to find the record 546 with the corresponding alarm identifier 542 of "A0004". In this example, the record 546 with the alarm identifier 543 of "A0004 is associated with the camera identifier 541 of "C0003" and the camera appliance identifier of "CA001", which, allows the surveillance computing system 140 to identify the camera 110 and the camera appliance 115, and then the surveillance computing system 140 can transmit the configuration command to the identified camera appliance 115 for the camera 110.

There may be one or more database table (not illustrated) in the database 500 or any other suitable record that associates camera device identifier (e.g., camera identifiers and/or camera appliance identifiers) with one or more connection parameters (e.g., IP address, port, authentication information, etc.) of camera devices (e.g., cameras and/or camera appliances). For example, the surveillance computing system 140 may compare the camera identifier "C0003" of the camera 110 to a database table (or other record) to obtain the connection parameters for the camera 110. Then, the surveillance computing system 140 may transmit the configuration command to the camera 110 using the obtained connection parameters. By way of another example, the surveillance computing system 140 may compare the camera appliance identifier "CA001" of the camera appliance 115 to a database table (or other record) to obtain the connection parameters for the camera appliance 115. Then, the surveillance computing system 140 may transmit the configuration command to the camera appliance 115 using the obtained connection parameters.

In some embodiments, the connection parameters (e.g., IP address, port, authentication information, etc.) for communicating with the camera devices are in the database table, such as in the database table 501, 502, 503, 504. In some embodiments, the camera identifier is an IP address of the camera 110, or the camera appliance identifier is an IP address of the camera appliance 115, and the surveillance computing system 140 can transmit the configuration command to the IP address of the camera device using the connection parameters.

The database tables 501, 502, 503, 504 may vary from the examples provided and may vary depending on practical applications, as they may be customized depending on the implemented environment.

In some embodiments, the configuration command includes one or more instructions for the camera device 105 (e.g., for the camera 110 or the camera appliance 115). In some embodiments, the configuration command includes one or more instructions and one or more parameters for each instruction. In some embodiments, the configuration command includes one or more instructions to modify the set of block parameters stored in the settings of the camera device 105. In some embodiments, the configuration command includes the set of block parameters for the camera device 105 to set into the settings of the camera device 105. In some embodiments, the configuration command includes a camera command. For example, the camera command may be to instruct the camera 110 to perform certain operations. In some embodiments, the configuration command includes a camera appliance command. For example, the camera appliance command may be to command the camera appliance 115 to perform certain operations for a certain camera 110 connected to the camara appliance 115. In some embodiments, the configuration command to the camera appliance 115 may include an identifier of the camera 110 connected to the camera appliance 115. In some embodiments, the configuration command is a mode of operation command. In some embodiments, the configuration command indicates to the camera device 105 to operate in a particular mode of operation preconfigured at the camera device 105. For example, the camera device 105 may be configured or preconfigured to operate in a primary mode of operation (e.g., suitable to generate large data blocks to reduce video archiving costs) and one or more temporary modes of operations (e.g., suitable for providing near live video). The primary mode of operation may correspond to primary settings of the camera device 105. In some embodiments, the primary mode of operation is a preconfigured default mode of operation and may correspond to default settings of the camera device 105. The default settings may correspond to preset settings, for example, when no overriding settings are provided, such as by a user configuring the camera device 105. Each temporary modes of operation may correspond to temporary settings of the camera device 105.

The configuration command transmitted to the camera device 105 may vary depending on the camera device 105 used. For example, the configuration command may vary depending on if the camera device 105 is a camera 110 and the type, made and/or model of the camera 110. Similarly, for example, the configuration command may vary depending on if the camera device 105 is a camera appliance 115 and the type, made and/or model of the camera appliance 115. The surveillance computing system 140 may authenticate with the camera device 105 prior to transmitting the configuration command. The configuration command may be transmitted to the camera device 105 over multiple requests and/or transmissions, and may comprises multiple commands, instructions and/or parameters. There may be multiple configuration commands being sent from the surveillance computing system 140 to the identified camera 110. While the configuration command may vary depending on implementation, the response of the camera device 105 may include one or more of the example responses and/or embodiments described herein.

Referring back to FIG. 2, at step 208, the camera device 105 receives the configuration command, modifies how it generates the video data 302 for transmission to the video archiver 150 based on the received configuration command, and transmits the modified video data to video archiver 150 over the network(s) 170. In general, the camera device 105 responds to the configuration command by modifying the transmission of the video data 302 thereby allowing for the computing device 160 to display near live video of the camera device 105 that would otherwise be unavailable for retrieval from the video archiver 150 in absence of the modifying of the transmitting of the video data 302.

For example, the configuration command may instruct the camera device 105 to reduce the size of the data blocks being generated. In some embodiments, the configuration command instructs the camera device 105 to generate the data blocks according to a second set of block parameters in order to reduce the size of the data block. In other words, the configuration command may instruct the camera device 105 to modify the first set of block parameters used to generate the data blocks 320 to a second set of block parameters that will result in the data blocks each being generated with a smaller size than the data blocks 320 generated with the first set of block parameters. In some embodiments, the first set of block parameters include at least one of: (i) a block video duration parameter set with a first video data size, and (ii) a block video data size parameter set with a first video duration; and the second set of block parameters include at least one of: (i) the block video duration parameter set with a second video data size that is smaller than the first video data size, and (ii) the block video data size parameter set with a second video duration that is smaller than the first video duration.

Figure 6A:
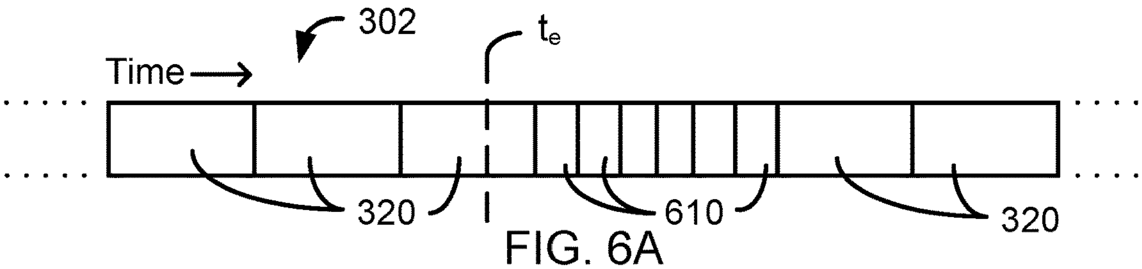
FIG. 6A is a diagram illustrating a first specific and non-limiting example of modifying of transmission of the video data from the camera device to the video archiver for providing near live video, in accordance with one or more embodiments.

With reference to FIG. 6A, there is illustrated a first example of modifying of the transmission of the video data 302 from the camera device 105 to the video archiver 150. Prior to a time of occurrence of the security event 400, illustrated as $t_e$, the video data 302 is transmitted with data blocks 320 generated according to the first set of block parameters. Similarly, prior to receipt of the configuration command, the video data 302 is transmitted with data blocks 320 generated according to the first set of block parameters. In response to the configuration command, the camera device 105 modifies the transmission of the video data 302 by generating the data blocks 610 of the video data 302 according to the second set of block parameters. In this example, the data blocks 610 generated according to the second set of block parameters are smaller than the data blocks 320 generated according to the first set of block parameters. The data blocks 610 are generated in block format, such as the block format 360 of FIG. 3C. In particular, in this example, the data 366 of the data blocks 610 are smaller in data size than the data 366 of the data blocks 320. In other words, the video data of the data blocks 610 generated according to the second set of block parameters is smaller in data size than the video data of the data blocks 320 generated according to the first set of block parameters. According, in some embodiments, the configuration command instructs the camera device 105 to generate data blocks 610 comprising data 366 smaller in data size than the data 366 of the previously generated data blocks 320 which were generated prior to the time $t_e$ of the security event 400. For example, the configuration command may indicate setting the block video duration parameter at a particular value (e.g., Configure Block Size=4 s). By way of another example, the configuration command may indicate setting the block video data size parameter at a particular value (e.g., Configure Block Size=50 MB). The data blocks 320 may be referred to as primary data blocks, default data blocks and/or initial data blocks, and the data blocks 610 may be referred to as secondary data blocks, size-reduced data blocks, and/or modified data blocks.

The configuration command may include one or more instructions for the camera device 105 to modify the settings of the camera device 105, for example, from the first set of block parameters to the second set of block parameters. The configuration command may include the set of block parameters for the camera device 105 to use, which in this example is the second set of block parameters.

The second set of block parameters may include any one or more of the parameters described in relation to the set of block parameters, for example, such as a block video data size parameter and/or a block video duration parameter. The second set of block parameters may generally correspond to the first set of block parameters where the value of one or more of the parameters in the second set of block parameters differs from that of the value of one or more of the parameters in the first set of block parameters. The second set of block parameters may be referred to as a temporary set of block parameters, a secondary set of block parameters, or a modified set of block parameters.

In some embodiments, the second set of block parameters includes the block video data size parameter and the block video duration parameter. Accordingly, in some embodiments, the data blocks 610 may be generated such that a size of a given one of the data blocks 610 varies between a size of the data 366 reaching the value of the block video data size parameter and a duration of video forming the data 366 reaching the value of the block video duration parameter, which ever is reached first while generating each data block 610. As such, the data blocks 610 may vary in data size between each other, as some data blocks may reach the block data size parameter while other data blocks may reach the block video duration parameter, which may result in the data blocks 610 have a non-constant data size between each other.

At this stage of operation of the camera device 105 at step 208, the camera device 105 may operate with temporary settings, such as, for example, when the settings of the camera device 105 are set to a temporary set of block parameters, and it may be said that the camera device 105 is operating in a temporary mode of operation. The temporary mode of operation is suitable for near live video retrieval from the video archiver 150. In contrast, the primary mode of operation would typically have delayed video retrieval times making it not suitable for near live video retrieval, but rather is more suitable for reducing or minimize costs with archiving video. The temporary mode of operation may be referred to as a "near live video mode of operation", a "second mode of operation" or a "secondary mode of operation". The temporary set of block parameters may correspond to the second set of block parameters. In some embodiments, the primary set of block parameters include at least one of: (i) a block video duration parameter set with a primary video data size, and (ii) a block video data size parameter set with a primary video duration; and the temporary set of block parameters include at least one of: (i) the block video duration parameter set with a temporary video data size that is smaller than the primary video data size, and (ii) the block video data size parameter set with a temporary video duration that is smaller than the primary video duration. The primary settings of the camera device 105 may be set with the primary set of block parameters to operate in the primary mode of operation, and the temporary settings of the camera device 105 may be set with the temporary set of block parameters to operate in the temporary mode of operation. The primary duration of a data block generated according to the primary settings may corresponds to: the primary video duration, or the maximum amount of video time that any data block generated with the primary video data size, or the shorter of the primary video duration and the maximum amount of video time that any data block generated with the primary video data size.

Figure 6B:
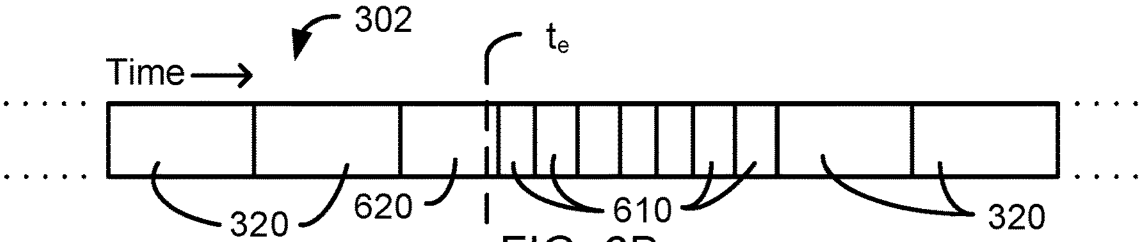
FIG. 6B is a diagram illustrating a second specific and non-limiting example of modifying of transmission of the video data from the camera device to the video archiver for providing near live video, in accordance with one or more embodiments.

In some embodiments, the configuration command instructs the camera device 105 to stop adding data to a current data block that it is adding video data thereto and transmit the current data block to the video archiver 150. With reference to FIG. 6B, there is illustrated a second example of modifying of the transmission of the video data 302 from the camera device 105 to the video archiver 150. Prior to the time $t_e$ of the security event 400, the video data 302 is transmitted with data blocks 320, which may be generated according to the first set of block parameters. In response to the configuration command, the camera device 105 modifying the transmitting of the video data 302 by stopping to add data to a current data block 620 being generated for transmission to the video archiver 150 and transmits the current data block 620 to the video archiver 150. In this example, the camera device 105 stops adding data to the current data block 620 that it is adding video data thereto, even though a data size of the data 366 of the current data block 620 has not reached the value of the block video data size parameter. The term "current" of the current data block 620 is used merely as a label to indicate that at the time of receiving the configuration command that the current data block 620 is a particular data block that the camera device 105 is generating and adding data thereto, which may include adding video data to a cache or a buffer for generating the current data block. The current data block 620 may be referred to as a "particular data block", a "given data block" or a "flushed data block".

In the second example illustrated in FIG. 6B, the camera device 105, in response to the configuration command, further modifies the transmitting of the video data 302 by generating the data blocks 610 of the video data 302 according to the second set of block parameters after transmitting of the current data block 620. Similar to the first example, the data blocks 610 generated according to the second set of block parameters in this second example are smaller than the data blocks 320 generated according to the first set of block parameters. In this example, the current data block 620 is smaller than the data blocks 320 generated according to the first set of block parameters. In particular, in this example, the data 366 of the current data block 620 is smaller in than the data 366 of the data blocks 320. In other words, the video data of the current data block 620 is smaller in data size than the video data of the data blocks 320 generated according to the first set of block parameters.

In some embodiments, the configuration command is a flush command, and the flush command may cause the camera device 105 to stop adding data to the current data block 620 being generated and transmits the current data block 620 to the video archiver 150. For example, the camera device 105 may include a data buffer that collects the video data to generate any given data block, and the data buffer stores the video data until it reaches the block video data size parameter and/or the block video duration parameter. The flush command may indicate to the flush the data buffer and transmit the data in the data buffer in a current data block 620.

Figure 6C:
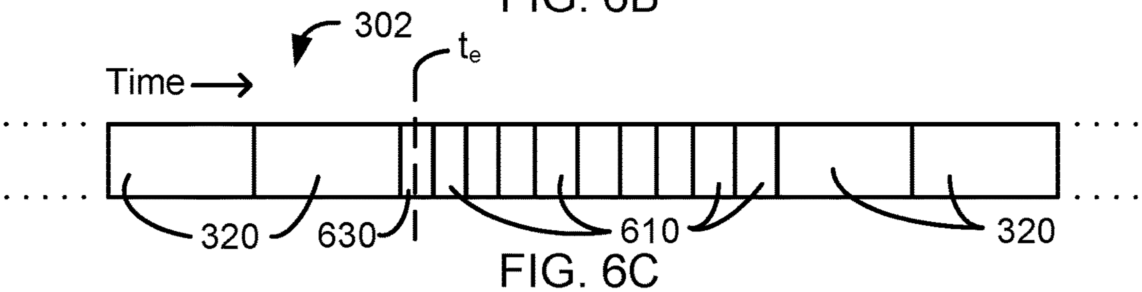
FIG. 6C is a diagram illustrating a third specific and non-limiting example of modifying of transmission of the video data from the camera device to the video archiver for providing near live video, in accordance with one or more embodiments.

In some embodiments, the configuration command instructs the camera device 105 to stop adding data to a current data block that it is adding video data thereto and to transmit the current data block to the video archiver 150, and the camera device 105 stops adding data to the current block unless the current data block is smaller than a minimum threshold size. In other words, when the current data block is smaller than the minimum threshold size, the camera device 105 may continue to add data to the current data block until the size reaches the minimum threshold size. With reference to FIG. 6C, there is illustrated a third example of modifying of the transmission of the video data 302 from the camera device 105 to the video archiver 150. The third example is similar to the second example of FIG. 6B; however, in this third example, the camera device 105 detects that video data of a current current data block 630 being generated for transmission to the video archiver 150 is smaller in data size than the minimum threshold size and proceed to continue to add data to the current data block 630 until the minimum threshold size is reached. For example, the camera device 105 may configured to add video data to the data buffer until the minimum threshold size is reached. The minimum threshold size may be included in the configuration command. In some embodiments, the configuration command instructs the camera device 105 to stop adding data to the current data block 630 and to transmit the current data block 630 to the video archiver 150 unless the current data block 630 is smaller than a minimum threshold size. In some embodiments, the settings of the camera device 105 may specify the minimum threshold size. The minimum threshold size may correspond to a size for generating the data blocks 610 generated according to the second set of block parameters. For example, the minimum threshold size may be the block video data size parameter and/or the block duration parameter of the second set of block parameters.

Figure 6D:
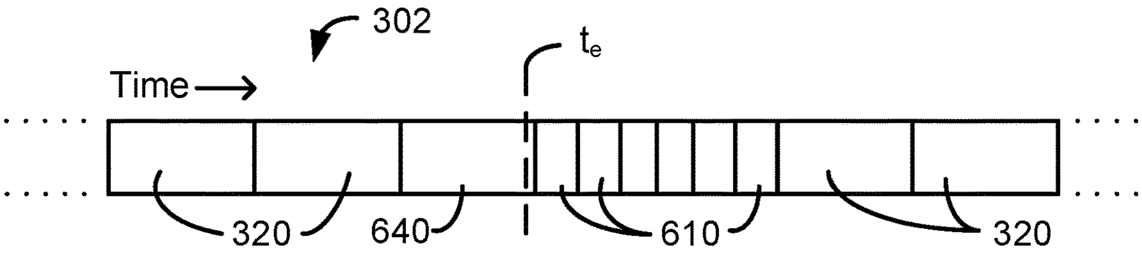
FIG. 6D is a diagram illustrating a fourth specific and non-limiting example of modifying of transmission of the video data from the camera device to the video archiver for providing near live video, in accordance with one or more embodiments.

In some embodiments, the configuration command instructs the camera device 105 to stop adding data to a current data block and transmits the current data block to the video archiver 150, and the camera device 105 stops adding data to the current data block unless the current data block being generated is larger than an upper threshold. When the current data block is larger than the upper threshold, the camera device 105 continues to add data to the current data block until the current data block has a size specified by the first set of block parameters. For example, this operation may be desired when the current data block is almost at the data size set by the first set of block parameters. With reference to FIG. 6D, there is illustrated a fourth example of modifying of the transmission of the video data 302 from the camera device 105 to the video archiver 150. The fourth example is similar to the second example of FIG. 6B; however, in this fourth example, the camera device 105 detects that a current data block 640 being generated for transmission to the video archiver 150 is larger in data size than the upper threshold and proceed to continue to add data to the current data block 640 until it reaches the size defined by the first set of block parameters. In other words, the current data block 640 is generated according to the same first set of block parameters that the data blocks 320 are generated therewith prior to the time $t_e$ of the security event 400. For example, the camera device 105 may configured to add video data to the data buffer until the block video data size parameter and/or the block duration parameter of the first set of block parameters is reached. The upper threshold may be set by the configuration command. The upper threshold may be in the first and/or second set of block parameters.

Figure 6E:
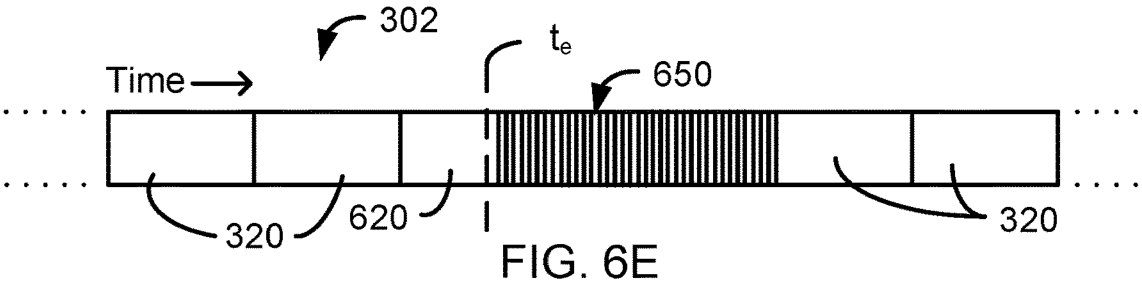
FIG. 6E is a diagram illustrating a fifth specific and non-limiting example of modifying of transmission of the video data from the camera device to the video archiver for providing near live video, in accordance with one or more embodiments.

In some embodiments, the configuration command instructs the camera device 105 to stop video data block transmission and to transmit a video data stream of images to the video archiver 150. With reference to FIG. 6E, there is illustrated a fifth example of modifying of the transmission of the video data 302 from the camera device 105 to the video archiver 150. The fifth example is similar to the second example of FIG. 6B; however, in this fifth example, the camera device 105 transmit a video data stream of images 650 to the video archiver 150 rather than adjusting the size of the data blocks. In this example, prior to the time $t_e$ of the security event 400, the video data 302 is transmitted with data blocks 320 generated according to the first set of block parameters. In response to the configuration command, the camera device 105 modifies video transmission by stopping video data block transmission and transmits the video data stream of images 650 to the video archiver 150. In the example of FIG. 6E, the camera device 105 may operate with temporary settings, which may occur without changing any block parameters (e.g., without changing from the primary set of block parameters), but rather one or more settings of the camera device 105 may be set with one or more parameters indicating that video data transmission is to occur as a video data stream of images 650, instead of transmission of video data blocks 320.

Figure 6F:
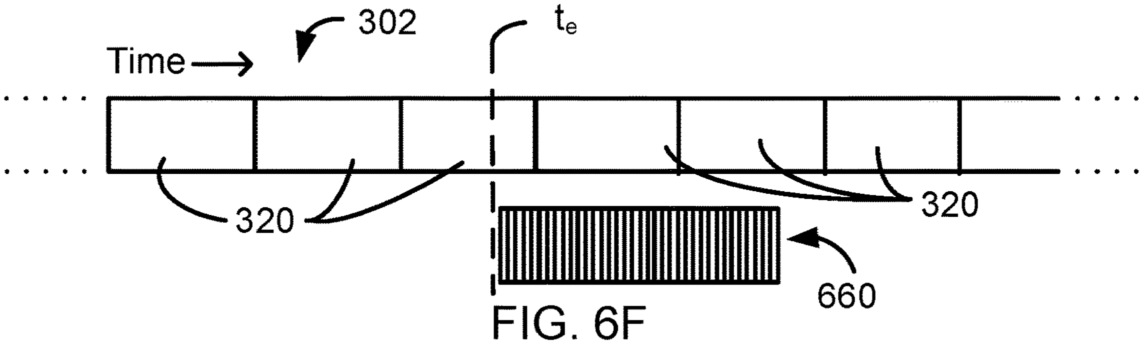
FIG. 6F is a diagram illustrating a sixth specific and non-limiting example of modifying of transmission of the video data from the camera device to the video archiver for providing near live video, in accordance with one or more embodiments.

In some embodiments, the configuration command instructs the camera device 105 to transmit a video data stream of images to the networked video archiver 150, in addition to the video data 302 in the block format 320. With reference to FIG. 6F, there is illustrated a sixth example of modifying of the transmission of the video data 302 from the camera device 105 to the video archiver 150. Prior to the time $t_e$ of the security event 400, the video data 302 is transmitted with data blocks 320 generated according to the first set of block parameters and the camera device 105 continues to transmit data blocks 320 generated according to the first set of block parameters even after the time $t_e$ of the security event 400. In response to the configuration command, the camera device 105 modifying the transmitting of the video data 302 by transmitting an additional video data stream 660 of images to the networked video archiver 150. In the example of FIG. 6F, the camera device 105 may operate with temporary settings, without changing any block parameters (e.g., without changing from the primary set of block parameters to the temporary set of block parameters), but rather operates with temporary settings that temporarily provides the additional video data stream 660 of images.

In some embodiments, the additional video data stream of images 660 may be transmitted from the camera device 105 in combination with any of the examples in FIGS. 6A to 6E.

In some embodiments, the video data stream of images 650 and/or 660 may have a start time occurring prior to the security event and/or prior to receiving the configuration command. For example, the data buffer may be collecting video data occurring in time prior to the security event and/or prior to receipt of the configuration command, and the video data in the data buffer may be used to generate the video data stream of images 650 and/or 660 having a start time occurring in time prior to the security event and/or receipt of the configuration command. All or part of the video data in the data buffer may be used to generate the video data stream of images 650 and/or 660. For example, the settings of the camera device 105 may specify all the video data in the data buffer should be transmitted as a stream of images. By way of another example, the settings of the camera device 105 may specify a certain amount (in time or in data size) of video data in the data buffer (e.g., the last 5 seconds of video in the data buffer), if available, should be transmitted as a stream of images.

In some embodiments, video data stream of images 650 or 660 is cached (i.e., locally stored) at the camera device 105 in a cache such that it may be provided to the computing device 160 in a similar manner to that of providing live video to the computing device 160. For example, after video data corresponding to the flushed data block 620 is transmitted from the video archiver 150 to the computing device 160 and is played back, then the cached video data stream of images 650 may be transmitted from the camera device 105 to the computing device 160 for playback. By way of another example, the video data stream of images 660 may be cached at the camera device 105, such that when the computing device 160 requests near live video of the camera device 105, the camera device 105 transmits the cached video data stream of images 660 to the computing device 160 for playback. In some embodiments, the configuration command may indicate to the camera device 105 to locally store the video data stream of images 650 and/or 660. In some embodiments, the data blocks (e.g., the data blocks 610, 620, 630 and/or 640) may be cached (i.e., locally stored) at the camera device 105, such that when the computing device 160 requests near live video of the camera device 105, the camera device 105 transmits the cached data blocks. In some embodiments, the configuration command may indicate to the camera device 105 to locally store the data blocks 320, 610, 620, 630 and/or 640. In some embodiments, the data blocks 320, 610, 620, 630 and/or 640, and/or the video data stream of images 650 and/or 660, are stored in the memory of the camera device 105, for example, such as in a hard drive or a memory card, and may be sent to the video archiver 150 when the request for near live video is requested, if the settings of the camera device 105 are configured for local storage. The video data cached at the camera device 105 may be deleted once transmitted to and received by the video archiver 150. In some embodiments, the data blocks 320, 610, 620, 630 and/or 640, and/or the video data stream of images 650 and/or 660, may be continuously transmitted to video archiver 150, if the settings of the camera device 105 is set to upload to the video archiver 150.

In some embodiments, the camera device 105 may be configured or preconfigured with the primary mode of operation and one or more temporary modes of operation. In some embodiments, the primary mode of operation is to generate the data blocks 320 according to the first set of block parameters. In some embodiments, the temporary mode of operation includes generating data blocks 610 according to the second set of block parameters. In some embodiments, the temporary mode of operation includes stopping data block transmission and transmitting the video data stream of images 650. In some embodiments, the temporary mode of operation includes transmitting the video data stream of images 660, in addition to the transmission of the data blocks 320. In some embodiments, the temporary mode of operation includes stopping to add data to a current data block 620, and then generating data blocks 610 according to the second set of block parameters or then transmitting the video data stream of images 650. In some embodiments, the camera device 105 may be configured or preconfigured multiple temporary modes of operations, such as one or more of the above examples, and the configuration command can indicate with one of the multiple temporary modes of operations the camera device 105 should operate therein.

Any of the data blocks 610, 620, 630, 640 may be generated in a similar manner to that described in relation to the data blocks 320, for example, such as at step 202. For example, any of the data blocks 610, 620, 630, 640 may be generated with a block format, such as the block format 360 and/or in accordance with a set of block parameters comprising one or more block parameters. The images in the data stream 660 of images and/or the data stream 650 of images may be referred to as image frames.

It should be appreciated that by modifying the transmitting of the video data 302, at step 208, that this allows for the computing device 160 to be able to display near live video of the camera device 105 that would otherwise be unavailable for retrieval from the video archiver 150 in absence of modifying of the transmitting of the video data. For instance, had the camera device 105 continued to generate data blocks 320 according to the first set of block parameters (or the primary set of block parameters), the camera device would have been in absence of modifying the transmitting of the video data 302, and near live video would be unavailable for retrieval from the video archiver 150.

Referring back to FIG. 2, at step 209, the video archiver 150 receives the modified video data transmitted at step 208 and processes the modified video data for storage. Step 209 may be performed in a same or similar manner as that described at step 203 of the process 200.

By modifying the generation and transmission of the video data 302 at step 208, this typically results in the video archiver 150 receiving video data faster that if no modification had occurred, and which typically allows for the video archiver 150 to provide near live video of the camera device 105 that would have otherwise been unavailable for retrieval from the video archiver 150 if the camera device 105 had continued to only generate and transmit data blocks according to primary settings (e.g., the setting of the camera device 105 set to the first set of block parameters).

For example, when the configuration command instructs the camera device 105 to generate the data blocks according to the second set of block parameters, rather than the first set of block parameters, to temporarily reduce the size of the data blocks, the video archiver 150 would typically receive a size-reduced data block 610 generated according to the second set of block parameters sooner than it would have if the camera device 105 had continued to generate and transmit a larger data blocks 320 generated in accordance with the first set of block parameters. In some cases, the video archiver 150 may also processes each size-reduced data block 610 faster than each larger data block 320, as the size-reduced data blocks 610 are smaller in data size than each of the larger data blocks 320. When the data blocks 610 are generated according to the second set of block parameters, the processing time at the video archiver 150 may be referred to as a secondary processing time. The secondary processing time of a size-reduced data block 610 may be less than the primary processing time of a larger data block 320. Thus, the video archiver 150 may make the video corresponding to a given size-reduced data block 610 available quicker compared to each larger data block 320.

By way of another example, when the configuration command instructs the camera device 105 to stop adding data to the current data block 620 and transmitted it to the video archiver 150, the video archiver 150 would typically receive the current data block 620 sooner than it would have if the camera had continued to generate and transmit the larger data blocks 320 generated, for example, in accordance with the first set of block parameters. In some cases, the video archiver 150 may also processes the current data block 620 faster than each larger data block 320, as the data block 620 is smaller in data size than each data blocks 320. Thus, the video archiver 150 may make the video corresponding to the current data block 620 available quicker compared to each larger data block 320.

By way of another example, when the configuration command instructs the camera device 105 to transmit a video data stream of images 650 or 660, either in replacement of data blocks 320 (e.g., as illustrated in FIG. 6E) or in addition to transmission of the data blocks 320 (e.g., as illustrated in FIG. 6F), the video archiver 150 would typically receive the video data stream of images 650 or 660 sooner than it would have if the camera had continued to generate and transmit the larger data blocks 320 generated, for example, in accordance with the first set of block parameters. In some cases, the video archiver 150 may also processes the video data stream of images faster 650 or 660 than each larger data block 320. Thus, the video archiver 150 may make the video corresponding to the video data stream of images 650 or 660 available quicker compared to each larger data block 320.

At step 210, the surveillance computing system 140 may transmit an alert over the network(s) 170 to the computing device 160 to indicate that the security event 400 has occurred. The alert could cause a notification to be outputted by the computing device 160, at step 211. The notification could be a visual and/or an audible notification. For example, the user could be viewing live video streams with the computing device 160, and a notification of the security event 400 could alert the user (e.g., a pop-up on the user's screen and/or an audible alarm output by the speakers of the computing device 160). By way of another example, the alert could cause a mobile computing device to show a notification of the security event 400. The alert may be transmitted to the computing device 160 in any suitable manner to cause a notification for the security event 400 to be outputted by the computing device 160. The alert may comprise data of the security event 400 and/or data that allows for the computing device 160 to request display of the near live video of the camera device 105 (e.g., the camera 110 and/or the camera appliance 115), for example, such as when it is requested by a user. The alert and the notification may vary depending on practical implementations.

Figure 7A:
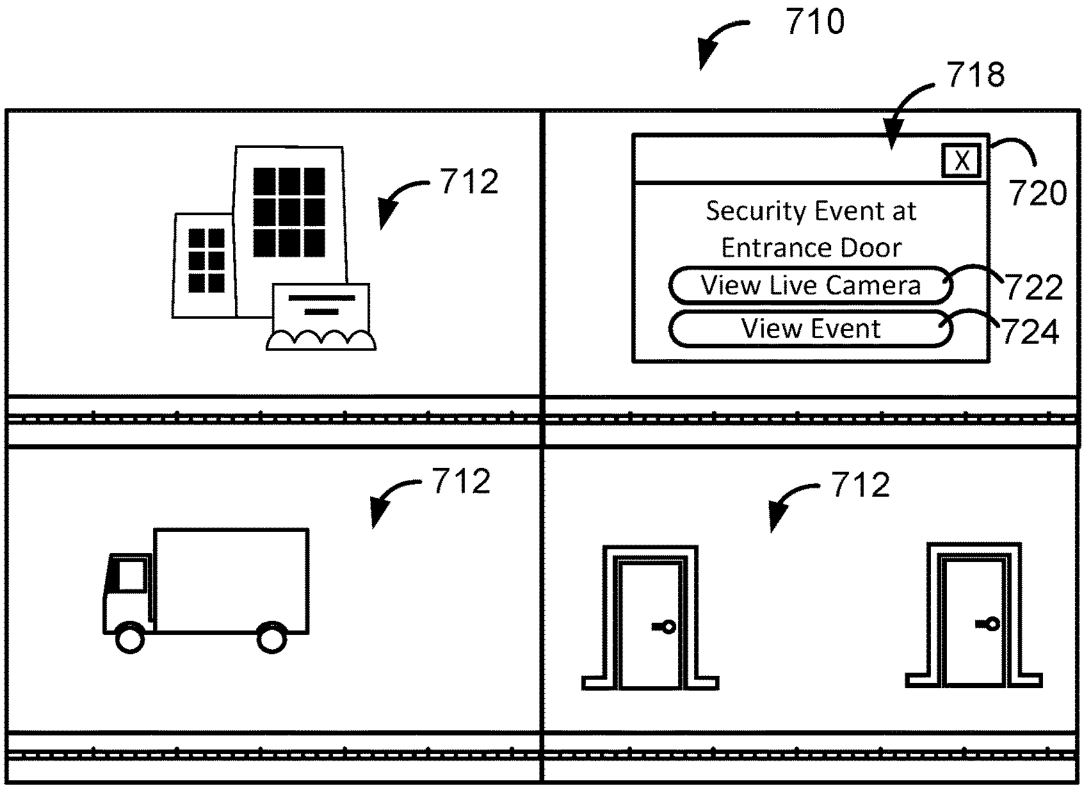
FIG. 7A is a diagram illustrating a graphical user interface (GUI) of an example of a notification of a security event, in accordance with one or more embodiments.
Figure 7B:
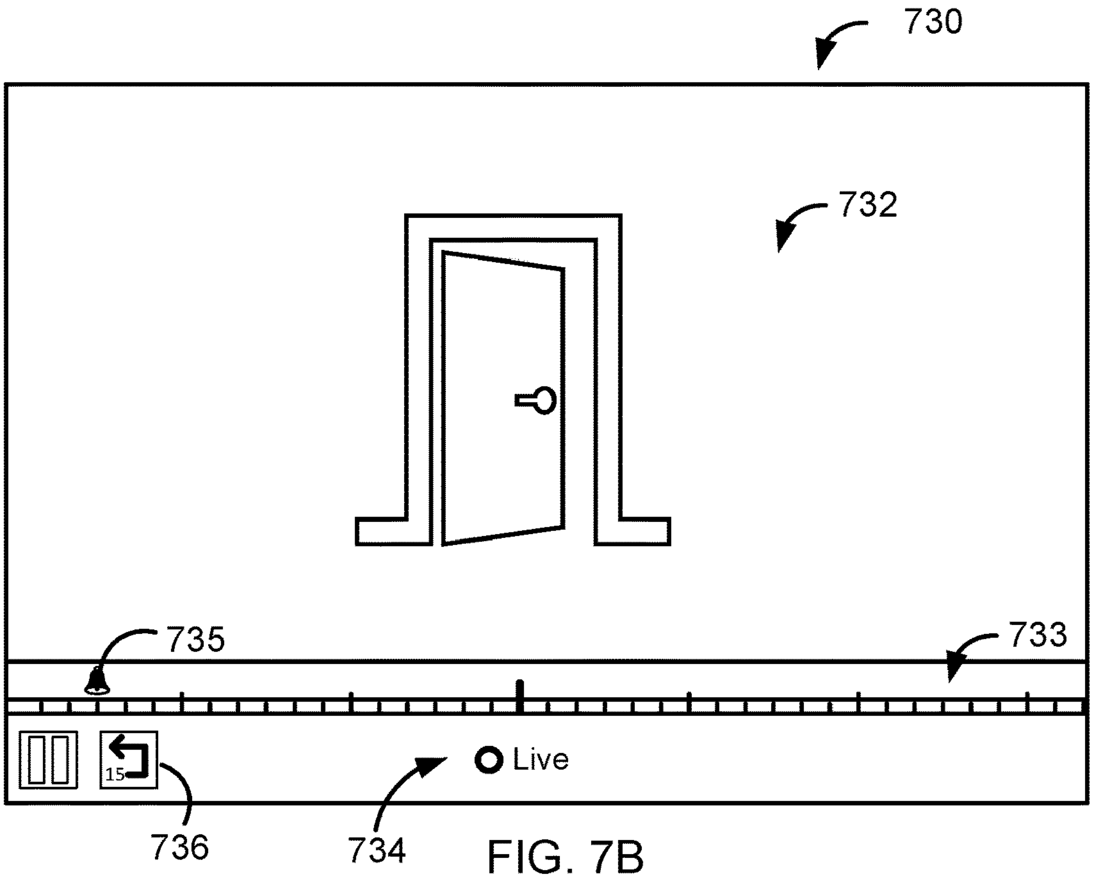
FIG. 7B is a diagram illustrating a GUI of live video of a camera associated with the security event of the notification of FIG. 7A, in accordance with one or more embodiments.

With additional reference to FIG. 7A, there is illustrated a graphical user interface (GUI) 710 being displayed on the display device 165 of the computing device 160 to show an example of a notification 718 output by the computing device 160 in response to receiving the alert of the security event 400. The GUI 710 comprises a plurality of display windows 712 showing live video. The GUI 710 comprises an alert box 720 indicating that security event has occurred at the entrance door, which in this example is the door 130. In this example, the notification 718 comprises the alert box 720. The alert box 720, in this example, comprises selectable buttons 722, 724, which allow the user to either view the live video of the door 130 or to view the video of the door 130 when the security event occurred. If a user of the computing device 160 selects to view the live video of camera 110 capturing the door 130, in this example, the live video only shows what is live and, in this example, only shows that the door is open, and as such the user wants to see recent non-live video, such as what occurred 15 seconds ago. With reference to FIG. 7B, there is illustrated a GUI 730 being displayed on the display device 165 of the computing device 160. The GUI 730 comprises a display window 732 showing live video of a door, which in this example is live video from the camera 110 capturing the door 130. As shown in the display window 732 there is an open door, but nothing that suggest what caused the security event 400. The GUI 710 comprises a timeline 733, which in this example is a selectable timeline allowing the user to request video occurring in the past. The timeline 733, which in this example, includes a security event indicator 735 to indicate the time $t_e$ that security event 400 occurred and which may be selected to view video at the time $t_e$ of the security event 400. The GUI 710 comprises a selectable button 736 to request to view video occurring 15 seconds in the past, which may be used to request to view the near live video. The GUI 710 comprises a live video indicator 734 to indicate to the user that the video being displayed is live.

Referring back to FIG. 2, at step 212, the computing device 160 may transmit a request over the network(s) 170 to view the near live video of the camera device 105 associated with the security event 400. As illustrated, the request to view the near live video of the camera device 105 associated with the security event 400 may be transmitted by the computing device 160 to the surveillance computing system 140. In some embodiments, the request to view the near live video of the camera device 105 associated with the security event 400 may be transmitted by the computing device 160 to the network video archiver 150. In some embodiments, the request to view the near live video of the camera device 105 associated with the security event 400 may be transmitted to the camera device 105, for example, when the near live video is cached at the camera device 105. In some embodiments, the request to view near live video may occur when a user drags an icon of camera corresponding to the camera 110 in a GUI into a tile for display and/or requests past recordings of video of the camera 110.

By way of example with additional reference to FIG. 7B, the user could request to view the camera's video occurring 15 seconds in the past from a current time, by selecting the button 736 to request to view video occurring 15 seconds in the past. In some embodiments, the button 736 is for requesting to view near live video. By way of another example, the user could select the security event indicator 735 to request to view video occurring at the time of the security event 400. By way of yet another example, the user could scroll in the selectable timeline 733 to view video occurring in the past, and which requests the near live video. The request to view the near live video may include an identifier of the camera device 105 (e.g., an identifier of the camera 110 and/or an identifier of the camera appliance 115) to allow for the surveillance computing system 140 and/or video archiver 150 to identify which camera device the computing device 160 has requested to view near live video therefrom. The request to view the near live video may include a timestamp indicative of the start time for playback of the near live video. The request to view the near live video may include any other suitable information.

At step 214, the surveillance computing system 140 may request that the video archiver 150 provide the near live video to the computing device 160, which may be based on any request for near live video received from the computing device 160. For example, the surveillance computing system 140 may process the request to view near live video to obtain information therein, such as, for example, the identifier of the camera device 105 (e.g., the identifier of the camera 110 and/or the identifier of the camera appliance 115), the connection information (e.g., the IP address of the computing device 160). The surveillance computing system 140 may then instruct the video archiver 150 to provide the near live video to the computing device 160 based on the obtained information from the request for near live video.

In some embodiments, the surveillance computing system 140 may automatically request that the video archiver 150 transmit near live video to the computing device 160 in response to obtaining the security event 400. For example, when the security event 400 is received, the surveillance computing system 140 may be configured to automatically request video be transmitted to the computing device 160, such as video occurring at the time $t_e$ of the security event or at a time period in the past offset from the current time or offset from the time of occurrence of the security event 400 (e.g., 30 seconds prior to the security event).

In some embodiments, the surveillance computing system 140 may request that the camera device 105 provide the near live video to the computing device 160. For example, when the near live video is cached at the camera device 105, the surveillance computing system 140 may request that the camera device 105 provide the near live video to the computing device 160. The camera device 105 may transmit an indicator to the surveillance computing system 140 to notify the surveillance computing system 140 that it has cached video, and, in this example, when the surveillance computing system 140 receives the request for near live video, it can request that the camera device 105 provide the near live video to the computing device 160.

At step 216, the video archiver 150 receives the request for near live video, process the request, transmits near live video to the computing device 160 for display.

The video archiver 150 may transmit the near live video to the computing device 160 based on the request at step 214. In some embodiments, the video archiver 150 may transmit the near live video to the computing device 160 based on the request at step 212. The video archiver 150 may obtain the identifier of the camera device 105 (e.g., the identifier of the camera 110 and/or the identifier of the camera appliance 115) from the request such that the video archiver 150 can identify the near live video to provide to the computing device 160. The video archiver 150 may obtain any connection information of the computing device 160 from the request so that it can transmit the near live video to the computing device 160.

In some embodiments, the video archiver 150 comprise an index of object identifiers of the data objects stored and the metadata of each data object. For instance, the data blocks 320, 610, 620, 630, and/or 640 and image frames of the video data streams of images 650 and/or 660, may be stored into data objects. In some embodiments, each data block corresponds to a respective data object. In some embodiments, multiple data blocks are stored in a corresponding data object. The video archiver 150 may process the request for near live video by comparing the information in the request (e.g., the camera device identifier and the start timestamp for playback of near live video) to the index to identify the object identifier of the data object corresponding to the requested near live video. The video archiver may then use the object identifier to obtain from storage the data object, such as a data block or one or more image frames, corresponding to the near live video. The video archiver 150 may then transmit the near live video to the computing device 160. The retrieval of the near live video from the video archiver 150 may vary depending on implementation.

It should be appreciated that by modifying the generating of the video data 302 that the video archiver 150 can typically obtain the requested near live video that would have otherwise been unavailable for retrieval from the video archiver 150 if the camera device 105 had continued to only generate and transmit data blocks 320 in the primary mode of operation.

Figure 7C:
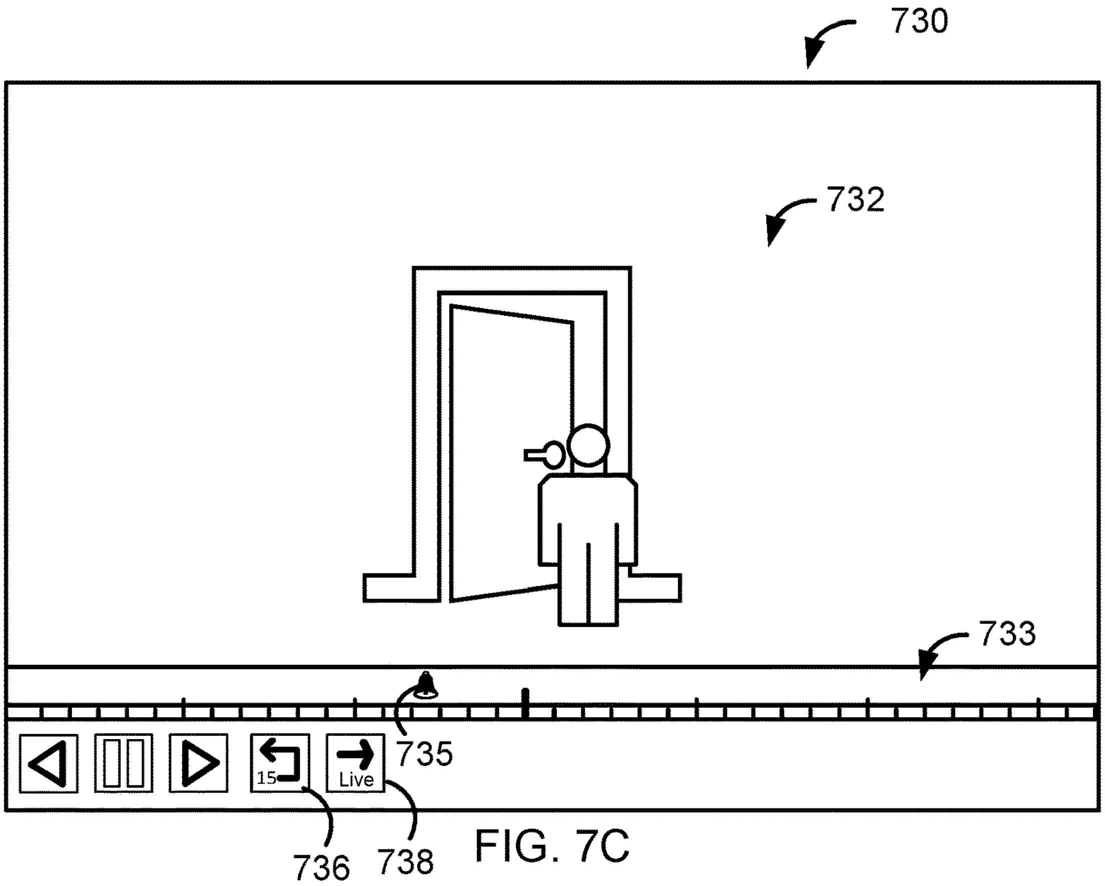
FIG. 7C is a diagram illustrating a GUI of a first specific and non-limiting example of near live video of the camera associated with the security event of FIG. 7B, in accordance with one or more embodiments.

At step 217, the computing device 160 displays the received near live video on the display device 165. By way of example, with reference to FIG. 7C, the display window 732 of the GUI 730 of FIG. 7B is shown to be providing near live video. In this example, the display window 732 in FIG. 7C is at a time occurring 15 seconds in the past from the live video of the display window 732 in FIG. 7B. For instance, the display window 732 in FIG. 7C could be shown when the user selects the button 736 of FIG. 7B to request to view video occurring 15 seconds in the past. As illustrated, the display window 732 shows a person walking through the door 130, which shows the user the perpetrator that caused the security event 400.

Figure 7D:
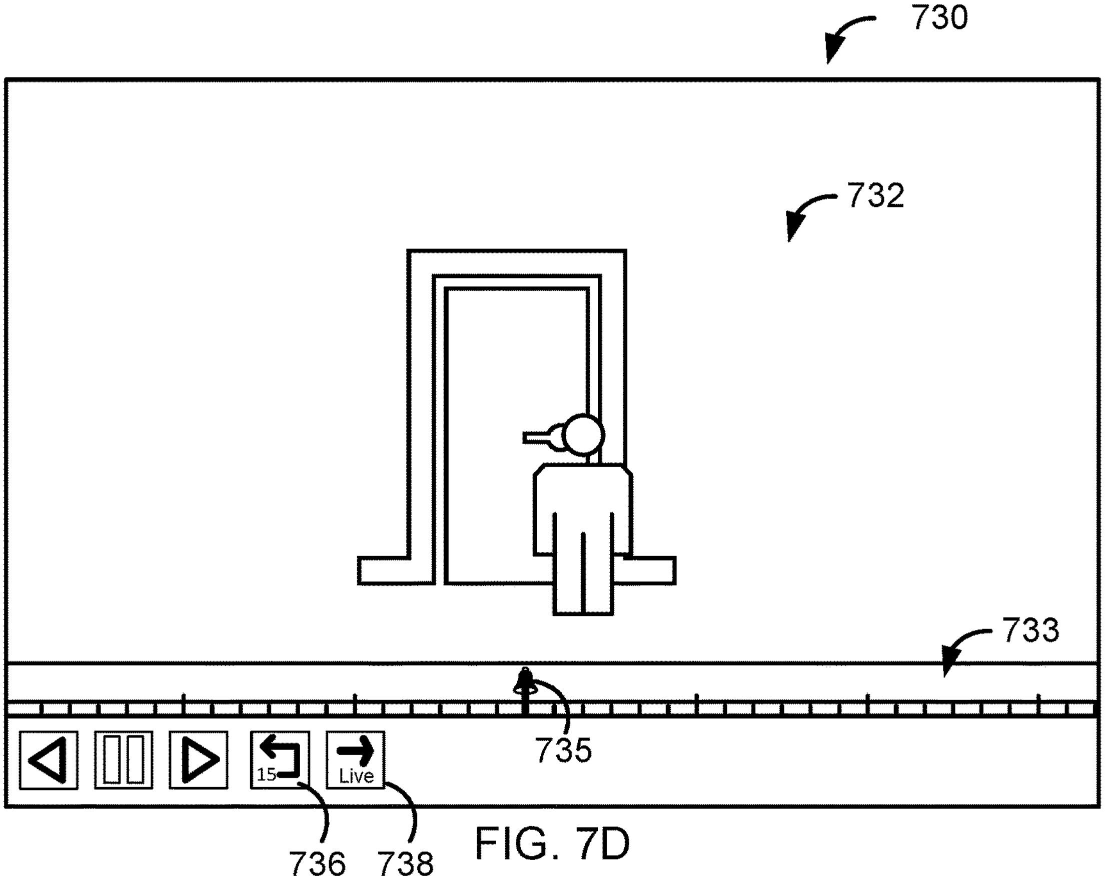
FIG. 7D is a diagram illustrating a GUI of a second specific and non-limiting example of near live video of the camera associated with the security event of FIG. 7B, in accordance with one or more embodiments.

By way of another example, with reference to FIG. 7D, the display window 732 of the GUI 730 of FIG. 7B is shown to be providing near live video. In this example, the display window 732 in FIG. 7D is at time immediately after the time $t_e$ of the occurrence of the security event 400. For instance, the display window 732 in FIG. 7D could be shown when the user selects the security event indicator 735 of FIG. 7B to request to view video at the time $t_e$ of occurrence of the security event 400. As illustrated, the display window 732 shows a person breaking into the door 130, which indicates to the user what caused the security event 400.

In some embodiments, the near live video corresponds to video occurring prior to the time $t_e$ of the occurrence of the security event 400. For example, the data buffer of the camera device 105 may have had video data stored therein occurring prior to the security event 400, which allows for near live video occurring shortly before the security event 400. By way of another example, the video data stream of images 650 and/or 660 may be generated to occur prior to the time $t_e$ of the occurrence of the security event 400, which allows for near live video occurring shortly before the security event 400.

It should be appreciated that by modifying the generating of the video data 302 that the computing device 160 can request and display near live video of the camera device 105 that would have otherwise been unavailable for retrieval from the video archiver 150 if the camera device 105 had continued to only generate and transmit data blocks 320 in the primary mode of operation.

At step 218, the user may indicate via the computing device 160 that it is no longer desired to view the near live video, and a request to end near live video is transmitted from the computing device 160 to the surveillance computing system 140 indicating that near live video is no longer needed. For example, the request to end near live video may occur when the user requests to view live video. For instance, the user could select the selectable button 738 in FIG. 7C or 7D, to request to view live video. By way of another example, the request to end near live video may occur when the user request that the video from the camera device 105 is no longer desired to be displayed. For instance, the user may close the display window 732, and this may trigger the request to end near live video. In some embodiments, there may be a user selectable button (not illustrated) that allows for the user to indicate that near live video is no longer desired.

At step 220, the surveillance computing system 140 may transmit a configuration command to the camera device 105 instructing the camera device 105 change back to the initial video transmission format. The configuration command at step 220 may be referred to as a second configuration command and the configuration command at step 206 may be referred to a first configuration command, in order to distinguish the two configuration commands from each other. The second configuration command may indicate to the camera device 105 to revert to generated data blocks 320 in accordance with the first set of block parameters. The second configuration command may be transmitted in response to the user indicating that it no longer desires to view the near live video.

In some embodiments, the second configuration command may be transmitted after a certain amount of time has passed from time $t_e$ of occurrence of the security event 400. In some embodiments, the second configuration command may be transmitted after a certain amount of time has passed from the transmission of the first configuration command.

The second configuration command may include the first set of block parameters. Alternatively, the first configuration command may indicate that the second set of block parameters is a temporary set of block parameters, and the camera device 105 may retain the first set of block parameters to revert thereto, for example, when requested or after a certain amount of time has passed.

In some embodiments, the first configuration command may indicate a usage time corresponding to a period of time to use the second set of block parameters and the camera device 105 may revert to the first set of block parameters after the usage time has elapsed. For example, the camera device 105 may run a timer for the usage time after it sets the setting of the camera device 105 to use the second set of block parameters and reverts the settings of the camera to the first set of block parameters after the timer runs out.

At step 222, the camera device 105 changes back to the initial form of generating and transmitting data blocks, which may be in respond to the configuration command of step 220, and the camera device 105 transmits the video data 302 in the original format to the video archiver 150. For example, as is shown in FIGS. 6A to 6E, the video data 302 reverts to transmitting data blocks 320 generated according to the first set of block parameters. By way of another example, as shown in FIG. 6F, the video data 302 stops generating the video data stream of images 660.

The order of the steps 202, 203, 204, 206, 208, 209, 210, 211, 212, 214, 216, 217, 218, 220 and 222 of the process 200 may vary depending on practical implementations and when suitable to change the order. Similarly, when suitable, the various steps of the process 200 described herein may be combined, uncombined, and/or omitted. For example, step 210 may occur prior to 206. By way of another example, step 214 may be omitted, such as when the user does not request to view the near live video. Yet by way of another example, some steps, such as steps 206 and 208, may be uncombined to form multiple steps.

Figure 8A:
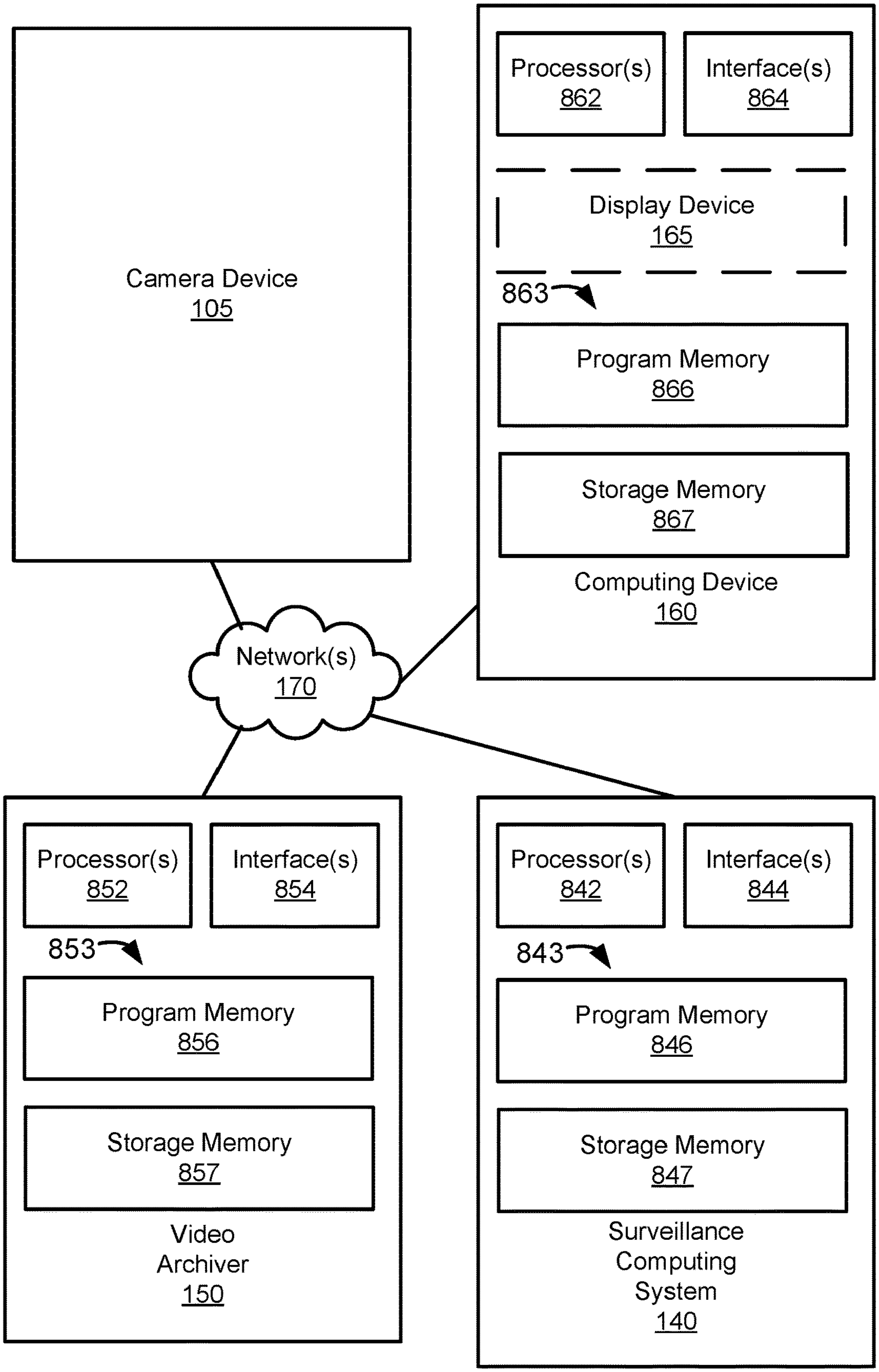
FIG. 8A is a block diagram of the surveillance computing system, video archiver, and the computing device, in accordance with one or more embodiments.

With reference to FIG. 8A, example processing circuitry of the surveillance computing system 140, the video archiver 150, and the computing device 160 are shown.

In this example, the surveillance computing system 140 comprise one or more processors 842, and further comprises one or more interfaces 844 and computer readable memory 843 all in communication with the one or more processors 842. The one or more processors 842 is generally referred to herein as the processor(s) 842, and the one or more interfaces 844 is generally referred to herein as the interface(s) 844. The memory 843 has stored thereon program instructions executable by the processor(s) 842 for performing the methods, processes, and/or the various embodiments described herein. The memory 843 may comprise program memory 846. In general, the program memory 846 stores program code that, when executed by the processor(s) 842, cause the processor(s) 842 to implement functions of the surveillance computing system 140 such as those described herein. For example, the program memory 846 stores program code that, when executed by the processor(s) 842, cause the processor(s) 842 to implement steps 204, 206, 210, 214, and 220 of the process 200. The program memory 846 includes operating system program codes of an operating system. The memory 843 may comprise storage memory 847. In general, the storage memory 847 stores storage code and/or data. For example, the storage memory 847 may store therein the information, such as the database tables, stored by the database 500, the configuration commands, and any other suitable information. The storage memory 847 may store therein storage code that is loaded into the program memory 846 for running any program on the surveillance computing system 140, and/or any other functions of the surveillance computing system 140 such as those described herein. The storage memory 847 may store therein any other suitable information. The interface(s) 844 may be any suitable input and/or output (I/O) interface(s). The interface(s) 844 may comprise one or more data interfaces and/or one or more network interfaces for communicating with the camera device 105, the camera 110, the camera appliance 115, the video archiver 150, the computing device 160, the sensor 120, the network device 125, the display device 165 and/or any other suitable devices. The surveillance computing system 140 may be connected to various input and/or output devices (e.g., keyboard, mouse, speakers, microphones, etc.) for controlling and/or interfacing with the surveillance computing system 140.

In this example, the video archiver 150 comprise one or more processors 852, and further comprises one or more interfaces 854 and computer readable memory 853 all in communication with the one or more processors 852. The one or more processors 852 is generally referred to herein as the processor(s) 852, and the one or more interfaces 854 is generally referred to herein as the interface(s) 854. The memory 853 has stored thereon program instructions executable by the processor(s) 852 for performing the methods, processes, and/or the various embodiments described herein. The memory 853 may comprise program memory 856. In general, the program memory 856 stores program code that, when executed by the processor(s) 852, cause the processor(s) 852 to implement functions of the video archiver 150 such as those described herein. For example, the program memory 856 stores program code that, when executed by the processor(s) 852, cause the processor(s) 852 to implement steps 203, 209, and 216 of the process 200. The program memory 856 includes operating system program codes of an operating system. The memory 853 may comprise storage memory 857. In general, the storage memory 857 stores storage code and/or data. For example, the storage memory 857 may store therein video data, such as video data received from the camera device 105. The storage memory 857 may store therein data blocks, such as the data blocks 320, 610, 620, 630, and 640, and video data streams of images, such as the video data streams of images 650 and 660. The storage memory 857 may store data objects, which may include data objects storing one or more data blocks, such as the data blocks 320, 610, 620, 630, 640, and which may include data objects storing video data streams, such as the video data streams of images 650 and 660. The storage memory 857 may store therein storage code that is loaded into the program memory 856 for running any program on the video archiver 150, and/or any other functions of the video archiver 150 such as those described herein. The storage memory 857 may store therein any other suitable information. The interface(s) 854 may be any suitable input and/or output (I/O) interface(s). The interface(s) 854 may comprise one or more data interfaces and/or one or more network interfaces for communicating with the camera device 105, the camera 110, the camera appliance 115, the surveillance computing system 140, computing device 160, and/or any other suitable devices. The video archiver 150 may be connected to various input and/or output devices (e.g., keyboard, mouse, speakers, microphones, etc.) for controlling and/or interfacing with the video archiver 150.

In this example, the computing device 160 comprise one or more processors 862, and further comprises one or more interfaces 864 and computer readable memory 863 all in communication with the one or more processors 862. The one or more processors 862 is generally referred to herein as the processor(s) 862, and the one or more interfaces 864 is generally referred to herein as the interface(s) 864. The memory 863 has stored thereon program instructions executable by the processor(s) 862 for performing the methods, processes, and/or the various embodiments described herein. The memory 863 may comprise program memory 866. In general, the program memory 866 stores program code that, when executed by the processor(s) 862, cause the processor (s) 862 to implement functions of the computing device 160 such as those described herein. For example, the program memory 866 stores program code that, when executed by the processor(s) 862, cause the processor(s) 862 to implement steps 211, 212, 217 and 218 of the process 200. The program memory 866 includes operating system program codes of an operating system. The memory 863 may comprise storage memory 867. In general, the storage memory 867 stores storage code and/or data. The storage memory 867 may store therein storage code that is loaded into the program memory 866 for running any program on the computing device 160, and/or any other functions of the computing device 160 such as those described herein. The storage memory 867 may store therein any other suitable information. The interface(s) 864 may be any suitable input and/or output (I/O) interface(s). The interface(s) 864 may comprise one or more data interfaces and/or one or more network interfaces for communicating with the camera device 105, the camera 110, the camera appliance 115, the video archiver 150, the surveillance computing system 140, the sensor 120, the network device 125, the display device 165 and/or any other suitable devices. The computing device 160 may be connected to various input and/or output devices (e.g., keyboard, mouse, speakers, microphones, display device 165, etc.) for interacting and/or controlling the computing device 160 and/or the surveillance computing system 140.

Figure 8B:
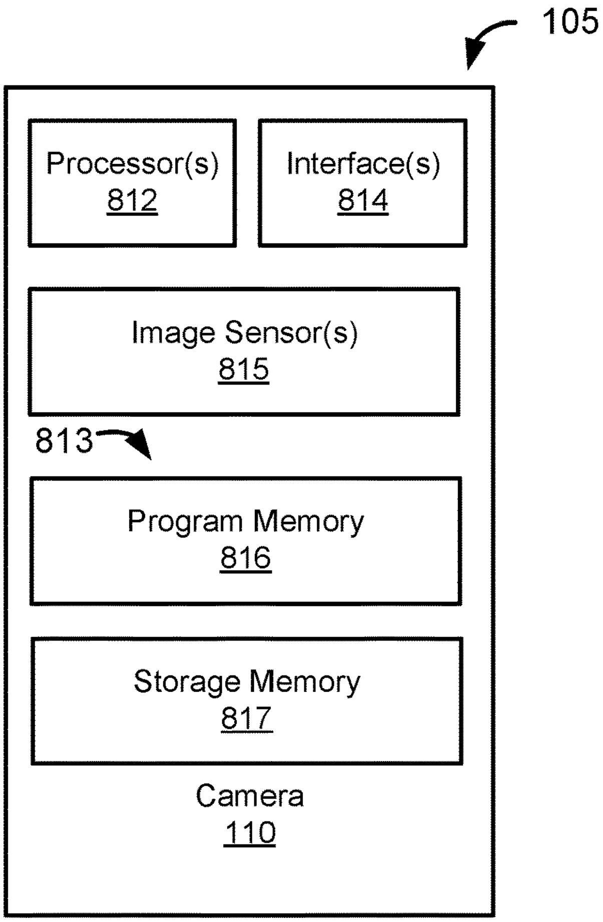
FIG. 8B is a block diagram illustrating the camera, in accordance with one or more embodiments.

With reference to FIG. 8B, example processing circuitry of the camera device 105, which in this example includes the camera 110, is shown. In this example, the camera 110 comprise one or more processors 812, and further comprises one or more image sensors 815, one or more interfaces 814 and computer readable memory 813 all in communication with the one or more processors 812. The one or more image sensors 815 is generally referred to herein as the image sensor(s) 815, the one or more processors 812 is generally referred to herein as the processor(s) 812, and the one or more interfaces 814 is generally referred to herein as the interface(s) 814. Each of the image sensor(s) 815 may be any suitable image sensor or optical sensor that detects and conveys information used to produce image frames. The memory 813 has stored thereon program instructions executable by the processor(s) 812 for performing the methods, processes, and/or the various embodiments described herein. The memory 813 may comprise program memory 816. In general, the program memory 816 stores program code that, when executed by the processor(s) 812, cause the processor(s) 812 to implement functions of the camera device 105 and/or the camera 110 such as those described herein. For example, the program memory 816 stores program code that, when executed by the processor(s) 812, cause the processor(s) 812 to implement steps 202, 208, and 222 of the process 200. The program memory 816 includes operating system program codes of an operating system. The memory 813 may comprise storage memory 817. In general, the storage memory 817 stores storage code and/or data. The storage memory 817 may store therein the settings of the camera 110, such as one or more sets of parameters (e.g., video encoding parameters, connection parameters, block parameters). The storage memory 817 may store therein storage code that is loaded into the program memory 816 for running any program on the camera 110, and/or any other functions of the camera 110 such as those described herein. The storage memory 817 may store therein any other suitable information. The memory 813, for example, the storage memory 817, may be used to implement a data buffer that stores video data used to generate data blocks. The memory 813, for example, the storage memory 817 may be used to implement a cache of video data. The interface(s) 814 may be any suitable input and/or output (I/O) interface(s). The interface(s) 814 may comprise one or more data interfaces and/or one or more network interfaces for communicating with the camera appliance 115, the video archiver 150, the surveillance computing system 140, the computing device 160, and/or any other suitable devices. The camera 110 may be connected to various input and/or output devices (e.g., speakers, microphones, etc.) for interfacing with camera 110.

Figure 8C:
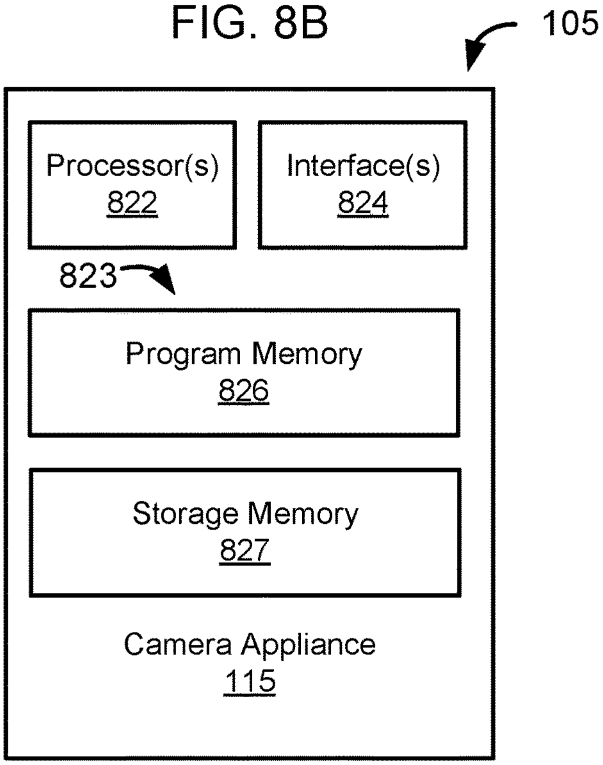
FIG. 8C is a diagram illustrating the camera appliance, in accordance with one or more embodiments.

With reference to FIG. 8C, example processing circuitry of the camera device 105, which in this example includes the camera appliance 115, is shown. In this example, the camera appliance 115 comprise one or more processors 822, and further comprises one or more interfaces 824 and computer readable memory 823 all in communication with the one or more processors 822. The one or more processors 822 is generally referred to herein as the processor(s) 822, and the one or more interfaces 824 is generally referred to herein as the interface(s) 824. The memory 823 has stored thereon program instructions executable by the processor(s) 822 for performing the methods, processes, and/or the various embodiments described herein. The memory 823 may comprise program memory 826. In general, the program memory 826 stores program code that, when executed by the processor(s) 822, cause the processor(s) 822 to implement functions of the camera device 105 and/or the camera appliance 115 such as those described herein. For example, the program memory 826 stores program code that, when executed by the processor(s) 822, cause the processor(s) 822 to implement steps 202, 208, and 222 of the process 200. The program memory 826 includes operating system program codes of an operating system. The memory 823 may comprise storage memory 827. In general, the storage memory 827 stores storage code and/or data. The storage memory 827 may store therein the settings of the camera appliance 115, such as one or more sets of parameters (e.g., video encoding parameters, connection parameters, block parameters). The storage memory 827 may store therein storage code that is loaded into the program memory 826 for running any program on the camera appliance 115, and/or any other functions of the camera appliance 115 such as those described herein. The storage memory 827 may store therein any other suitable information. The memory 823, for example, the storage memory 827, may be used to implement a data buffer that stores video data used to generate data blocks. The memory 823, for example, the storage memory 827 may be used to implement a cache of video data. The interface(s) 824 may be any suitable input and/or output (I/O) interface(s). The interface(s) 824 may comprise one or more data interfaces and/or one or more network interfaces for communicating with the camera 110, the video archiver 150, the surveillance computing system 140, the computing device 160, and/or any other suitable devices. The camera appliance 115 may be connected to various input and/or output devices (e.g., keyboard, mouse, speakers, microphones, etc.) for interfacing with camera appliance 115.

The surveillance computing system 140, the video archiver 150, and/or the computing device 160 may vary from the examples provided in FIG. 8A. Similarly, the camera 110 and/or the camera appliance 115 may vary from the examples provided in FIGS. 8B and 8C.

Figure 8D:
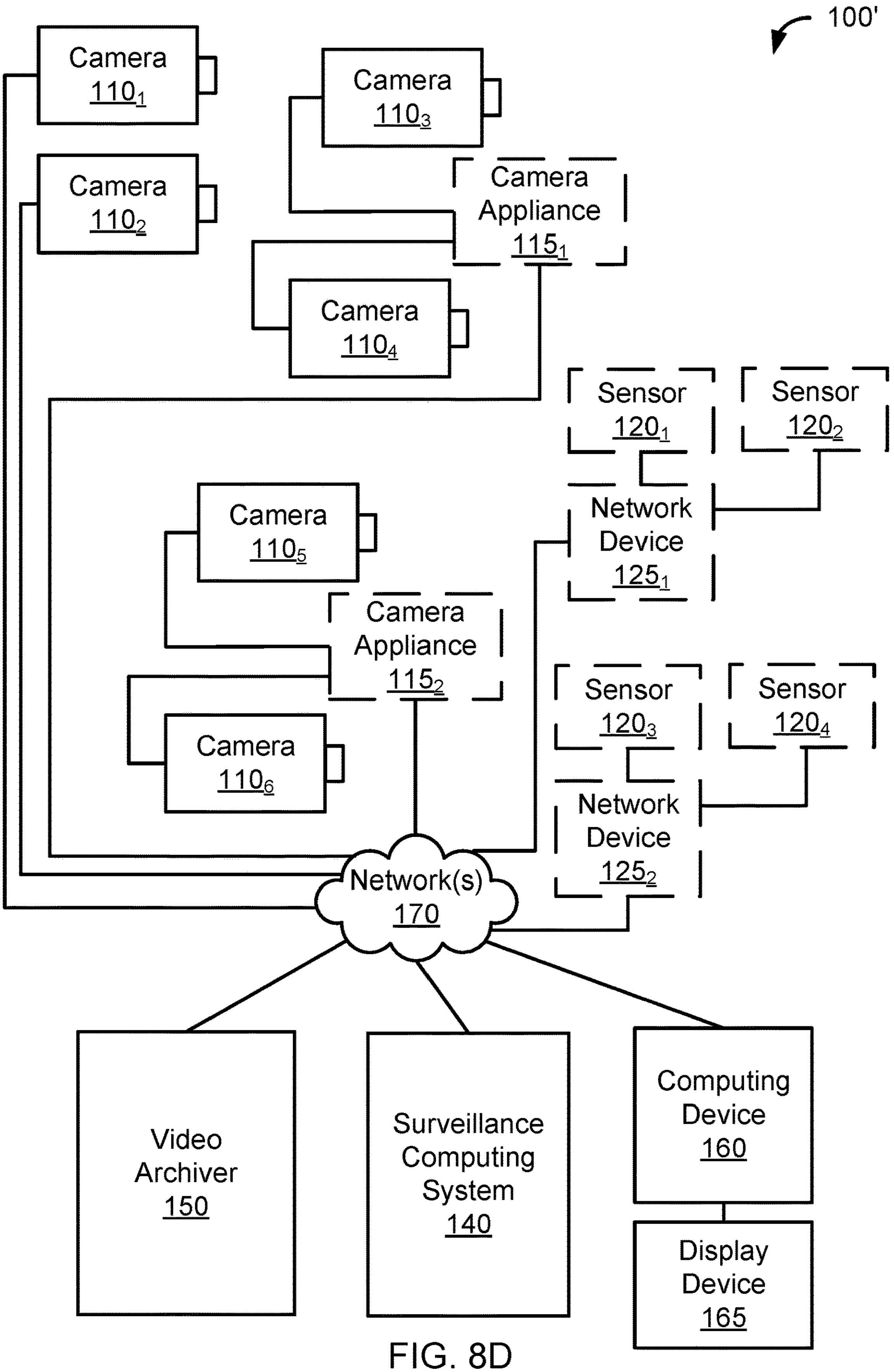
FIG. 8D is a diagram illustrating another example security system for providing near live video of one or more camera devices to the computing device by the surveillance computing system, in accordance with one or more embodiments.

With reference to FIG. 8D, there is illustrated a variant of the example security system 100, referred to as the security system 100', for providing near live video of any of a plurality of cameras $\mathbf{110_1}$, $\mathbf{110_2}$, $\mathbf{110_3}$, $\mathbf{110_4}$, $\mathbf{110_5}$, $\mathbf{110_6}$, to the computing device 160 by the surveillance computing system 140. In this example, the cameras $\mathbf{110_1}$, $\mathbf{110_2}$ are connected to the network(s) 170 and the cameras $\mathbf{110_3}$, $\mathbf{110_4}$,$\mathbf{110_5}$, $\mathbf{110_6}$ may be connected to the network(s) 170 via one of a plurality of camera appliances $\mathbf{115_1}$, $\mathbf{115_2}$. In some embodiments, the plurality of camera appliances $\mathbf{115_1}$, $\mathbf{115_2}$ is optional, and may be omitted. Any of the cameras $\mathbf{110_1}$, $\mathbf{110_2}$, $\mathbf{110_3}$, $\mathbf{110_4}$, $\mathbf{110_5}$, $\mathbf{110_6}$ may be implemented according to the camera 110 and may function in a same or similar manner to that of the camera 110, as described in this document, for example. Similarly, any of the camera appliances $115_1$, $115_2$ may be implemented according to the camera appliance 115 and may function in a same or similar manner to that of the camera appliance 115, as described in this document, for example. As illustrated, in this example, a plurality of sensor $120_1$, $120_2$, $120_3$, $120_4$, may be provided for security monitoring purposes. The sensor $120_1$, $120_2$, $120_3$, $120_4$ may be connected to the network(s) 170 via one of a plurality of network devices $125_1$, $125_2$. Any of the sensor $120_1$, $120_2$, $120_3$, $120_4$ may be implemented according to the sensor 120 and may function in a same or similar manner to that of the sensor 120, as described in this document, for example. Similarly, any of the network devices $125_1$, $125_2$ may be implemented according to the network device 125 and may function in a same or similar manner to that of the network device 125, as described in this document, for example. The sensor $120_1$, $120_2$, $120_3$, $120_4$ and/or the network devices $125_1$, $125_2$ are optional, and may be omitted. The number of sensors, the number of network devices, the number of cameras, the number of camera appliances, may vary depending on practical implementation.

In this example, any of the sensors $120_1$, $120_2$, $120_3$, $120_4$, any of the network devices $125_1$, $125_2$, any of the cameras $110_1$, $110_2$, $110_3$, $110_4$, $110_5$, $110_6$, and any of the camera appliances $115_1$, $115_2$ may be transmitting security events (or data indicative of security events) to the surveillance computing system 140. In some embodiments, the video archiver 150 may perform motion detection and generate security events that are transmitted to the surveillance computing system 140. The surveillance computing system 140 processes the various security events and identifies the appropriate cameras and/or camera appliances associated with each security event. For instances, the surveillance computing system 140 may process a particular security event to identify a camera (or a camera appliance and corresponding camera) from a plurality of cameras (or from a plurality of camera appliances in communication with one or more cameras). The surveillance computing system 140 may transmit configuration commands to the appropriate camera devices (e.g., cameras and/or camera appliances) having security events associated therewith to instruct the camera devices to modify video data transmission to allow for near live video.

It should be appreciated that the security system 100, 100' may vary from the examples provided, and may vary depending on practical implementations.

Figure 9:
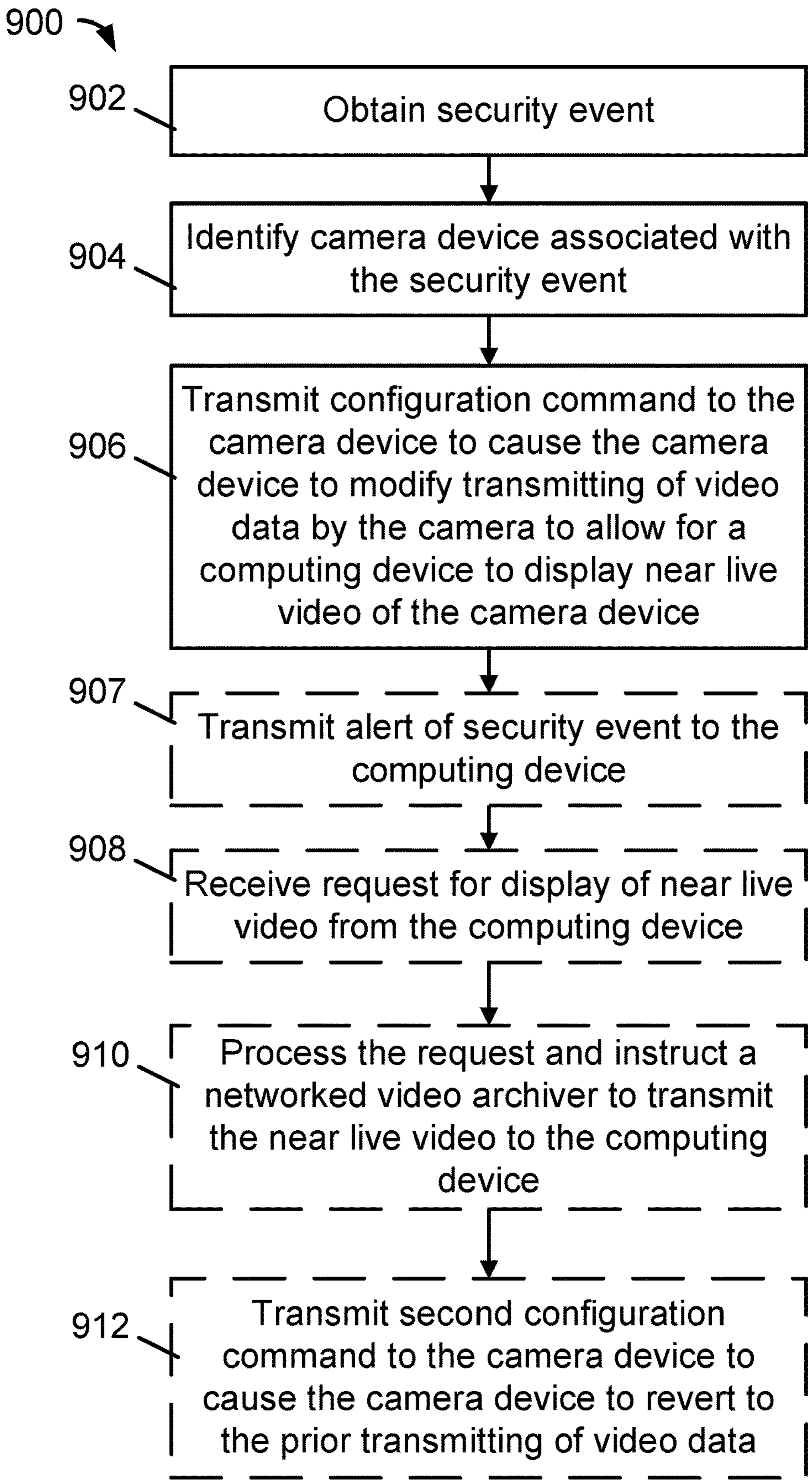
FIG. 9 is a flowchart illustrating an example method for providing near live video by the surveillance computing system, in accordance with one or more embodiments.

With reference to FIG. 9, there is shown a flowchart illustrating an example method 900. The method 900 may be performed by the surveillance computing system 140 or by any other suitable computing device, system, or the like. In explanation of the method 900, any reference to the system 100 (or 100') and to the process 200 is made for example purposes. The system in which the method 900 may operate may vary depending on practical implementations.

Step 902 includes obtaining, at a surveillance computing system 140, a security event 400. The obtaining of the security event 400 may include receiving the security event 400 at the surveillance computing system 140 from a sensor 120. The obtaining of the security event 400 may include generating the security event 400 at the surveillance computing system 140. In some embodiments, the surveillance computing system 140 receives data indicative of the security event 400, for example, from the sensor 120, and the surveillance computing system 140 generates the security event 400 from the data indicative of the security event 400. The security event 400 (or data indicative of the security event 400) may be received at the surveillance computing system 140 from the sensor 120 via transmission through at least one network device 125 and/or over one or more networks 170. In some embodiments, the obtaining of the security event 400 includes receiving the security event 400 from a camera device 105, for example, a camera 110 or a camera appliance 115. The obtaining of the security event 400 may be as described at step 204 of the process 200, for example.

Step 904 includes identifying, by a surveillance computing system 140, a camera device 105 associated with the security event 400, where the camera device 105 is transmitting video data 302 comprising data blocks 320 to a networked video archiver 150 for storage. The identifying of the camera device 105 may include identifying the camera device 105 from the security event 400. The identifying of the camera device 105 may include identifying the camera device 105 from a plurality of camera devices. The identifying of the camera device 105 may include identifying a camera 110. The identifying of the camera device 105 may include identifying a camera appliance 115. The identifying of the camera device 105 may include identifying a camera appliance 115 and a camera 110 connected to the camera appliance 115. The identifying of the camera device 105 from the security event may include obtaining at least one identifier of the camera device 105 from the security event 400. The at least one identifier of the camera device 105 may include an identifier of the camera 110 and/or an identifier of the camera appliance 115. The identifying of the camera device 105 from the security event may include obtaining an identifier of the security event 400 and comparing the identifier of the security event 400 to at least one record (e.g., at least one database table) to obtain at least one identifier of the camera device 105. The identifying of the camera device 105 may be as described at step 206 of the process 200, for example. In some embodiments, the camera device 105 is generating the data blocks of the video data according to a first set of block parameters prior to the obtaining of the security event. The first set of block parameters may be as described elsewhere in this document. The transmitting of the video data 302 comprising the data blocks 320 by the camera device 105 may be as described at step 202 of the process 200, for example.

Step 906 includes transmitting, by the surveillance computing system 104, a configuration command to the camera device 105 identified as associated with the security event 400. At step 906, the configuration command causes the camera device 105 to perform one or more operations including modifying the transmitting of the video data 302 to allow for a computing device 160 to display near live video of the camera device 105 that would otherwise be unavailable for retrieval from the networked video archiver 150 in absence of the modifying of the transmitting of the video data 302. The transmitting of the configuration command to the identified camera device 105 may be based on the at least one obtained identifier of the camera device 105. The at least one obtained identifier of the identified camera device 105 may include and/or may be used to determine connection parameters to communicate with the identified camera device 105. The one or more operations performed by the camera device 105 may vary depending on the camera device 105, the make, the model, and/or whether the camera device 105 is a camera 110 or a camera appliance 115. The one or more operations performed by the camera device 105 generally correspond to one or more steps that the camera device 105 performs in response to the configuration command. The one or more operations performed by the camera device 105 may include executing one or more instructions, in response to the configuration command.

In some embodiments, at step 906, the configuration command, at least in part, causes the camera device 105 to modify the transmitting of the video data 302 by generating the data blocks 610 according to a second set of block parameters, where the data blocks 610 generated according to the second set of block parameters are smaller than the data blocks 320 generated according to the first set of block parameters. The configuration command may include instructions to set the settings of the camera device 105 to include the second set of block parameters. The configuration command may include instructions to modify the settings of the camera device 105 to replace the first set of block parameters with the second set of block parameters. The configuration command may include instructions to temporarily use the second set of block parameters and to revert to the first set of block parameters after a specified period of time.

In some embodiments, at step 906, the configuration command, at least in part, causes the camera device 105 to modify the transmitting of the video data by stopping data from being added to a current data block 620 being generated for transmission to the networked video archiver 150 and by transmitting the current data block 620 to the networked video archiver 150, where the current data block 620 transmitted by the camera device 105 to the networked video archiver 150 is smaller than the data blocks 320 generated according to the first set of block parameters. The configuration command may include instructions to stop data from being added to a current data block 620 and to transmit the current data block 620 to the networked video archiver 150.

In some embodiments, at step 906, the configuration command, at least in part causes, the camera device 105 to modify the transmitting of the video data 302 by transmit a video data stream 650 of images to the networked video archiver 150. In some embodiments, the video data stream 650 of images replaces the data blocks 320. In some embodiments, the configuration command causes the camera device 105 to stop transmission of data blocks 320 and to transmit a video data stream 650 of images to the networked video archiver 150. In some embodiments, the configuration command comprises at least one of a command to stop video data block transmission and a request for transmission of a video data stream 650 of images to the networked video archiver 150.

In some embodiments, at step 906, the configuration command causes the camera device 105 to modify the transmitting of the video data by transmit the video data 302 including a video data stream 660 of images to the networked video archiver 150, in addition to the transmitting of the video data 302 comprising the data blocks 320. The configuration command may include instructions to transmit an additional video data stream of images 660.

The configuration command and/or the modifying of the transmitting of the video data 302 to allow for the computing device 160 to display near live video may be as described at step 206 and/or 208 of the process 200, and/or may be as described in relation to methods 920, 940, 960, described elsewhere in this document, for example.

In some embodiments, the method 900 optionally includes step 907. Step 907 includes transmitting, by surveillance computing system 140, an alert of the security event 400 to the computing device 160. The alert may cause the computing device 160 to output a notification indicative of the security event 400. The transmitting of the alert of the security event to the computing device at step 907 may be as described at step 210 of the process 200, for example.

In some embodiments, the method 900 optionally includes step 908. Step 908 includes receiving, at the surveillance computing system 140, a request for display of the near live video of the camera device 105 from the computing device 106. The receiving of the request for the near live video may be as described at step 214 of the process 200, for example.

In some embodiments, the method 900 optionally includes step 910. Step 910 includes processing, at the surveillance computing system 140, the request for near live video and instructing the networked video archiver 150 to transmit the near live video the computing device 160. The near live video is transmitted to the computing device 160 such that the computing device 160 is able to display the near live video on a display device 165. The display device 165 may be connected to the computing device 160. In some embodiments, the computing device 165 comprises the display device 165.

In some embodiments, the near live video requested by the computing device 160 corresponds to video transmitted, from the camera device 105 to the networked video archiver 150, with data blocks 610 generated according to the second set of block parameters.

In some embodiments, the near live video requested by the computing device 160 corresponds to video transmitted, from the camera device 105 to the networked video archiver 150, in the current data block 620.

In some embodiments, the near live video requested by the computing device 160 corresponds to video transmitted in the video data stream of images 650 or 660 transmitted by the camera device 105 to the networked video archiver 150.

The processing of the request for near live video and the instructing of the network video archiver 150 to transmit the near live video may be as described at step 214 of the process 200, for example.

In some embodiments, the surveillance computing system 150 processes the request for near live video and instructing the camera device 105 to transmit the near live video to the computing device 160 such that the computing device 160 displays the near live video on the display device 165. For example, the camera device 105 may store the video data stream of images 650 (and/or 660) corresponding to the near live video in the memory of the camera device 105 and may be configured to provide it to the video archiver 150 and/or the computing device 160 on request. By way of another example, the camera device 105 may store the data blocks 610 (and/or 620) corresponding to the near live video in the memory of the camera device 105 and may be configured to provide it to the video archiver 150 and/or the computing device 160 on request. The stored data blocks 610 (and/or 620) and/or the stored video data stream of images 650 (and/or 660) may be transmitted to the computing device 160 via the networked video archiver 150, such as, for example, via cloud services of the networked video archiver 150.

In some embodiments, the method 900 optionally includes step 912. In some embodiments, the configuration command at step 906 is a first configuration command. In some embodiments, the camera device 105 generates the data blocks 320 of the video data 302 according to the first set of block parameters prior to receiving the first configuration command. Step 912 includes transmitting, by the surveillance computing system 140, a second configuration command to the camera device 105 identified as associated with the security event 400. At step 912, the second configuration command causes the camera device 105 to perform one or more operations including stopping the modifying of the transmitting of the video data 302 and reverting to generating the data blocks 320 of the video data 302 according to the first set of block parameters. In some embodiments, the second configuration command instructs the camera device 105 to generate the data blocks 320 of the video data 302 according to the first set of block parameters. In some embodiments, the second configuration command instructs the camera device 105 to stop transmitting of the additional video data stream of images 660.

In some embodiments, the camera device 105 operates in a primary mode of operation prior to receiving the first configuration command, and the first configuration commands instructs the camera device to operate in a temporary mode of operation suitable for providing near live video and the second configuration command instructs the camera device to revert to the primary mode of operation.

The order of the steps 902, 904, 906, 907, 908, 910, and 912 may vary depending on practical implementations and when suitable to change the order. For example, step 907 may occur prior to step 906. When suitable, the various steps of the method 900 described herein may be combined, uncombined, and/or omitted. For example, steps 908 and 910 may be combined. By way of another example, step 910 may be uncombined to form multiple steps.

In some embodiments, the camera device 105 (e.g., the camera 110 and/or the camera appliance 115) may be configured to perform motion detection, and when motion is detected by the camera device 105, the camera device 105 may perform one or more operations including modifying the transmitting of the video data 302 to allow for the computing device 160 to display near live video of the camera device 105 that would otherwise be unavailable for retrieval from the networked video archiver 150 in absence of the modifying of the transmitting of the video data 302. Accordingly, in some embodiments, steps 906 may be omitted. Similarly, when the camera device 105 (e.g., the camera 110 and/or the camera appliance 115) is configured to perform motion detection, the method 900 may be modified such that the method 900 may be performed by the camera device 105 (e.g., the camera 110 and/or the camera appliance 115). For example, the camera device 105 may obtain the security event 400 (e.g., motion detected event); and in response to the security event 400, the camera device modifies the transmitting of the video data 302 to allow for the computing device 160 to display near live video of the camera device 105 that would otherwise be unavailable for retrieval from the networked video archiver 150 in absence of the modifying of the transmitting of the video data 302.

Figure 10A:
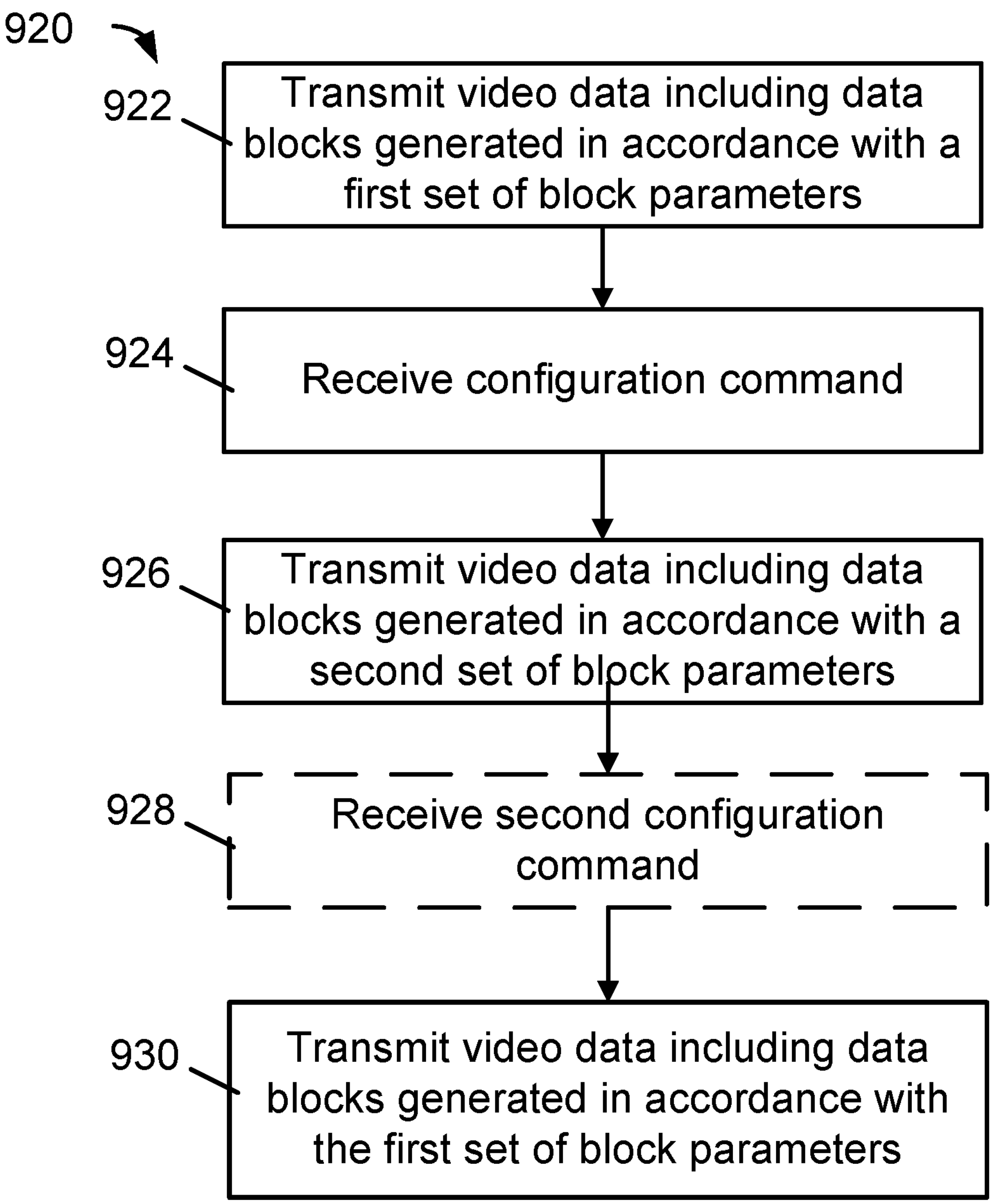
FIG. 10A is a flowchart illustrating a first specific and non-limiting example of a method for providing near live video by the camera device, in accordance with one or more embodiments.

With reference to FIG. 10A, there is shown a flowchart illustrating an example method 920. The method 920 may be performed by the camera device 105, the camera 110, the camera appliance 105 or by any other suitable camera, camera appliance, camera device, computing device, or the like. In explanation of the method 920, any reference to the system 100 (or 100') and to the process 200 is made for example purposes. The system in which the method 920 may operate may vary depending on practical implementations. The method 920 may be performed by the camera device 105, the camera 110 and/or the camera appliance 105 based on one or more commands and/or instructions from the surveillance computing system 140. The method 920 may be performed to generate the video date 302 of FIG. 6A, for example.

Step 922 includes transmitting, by the camera device 105, video data 302 comprising data blocks 320 to the networked video archiver 150. At step 922, the camera device 105 generates the data blocks according to a first set of block parameters. The first set of block parameters may be as described elsewhere in this document. In some embodiments, the transmitting of the video data 302 including the data blocks 320 is by the camera 110. In some embodiments, the camera 110 generates the data blocks 320 according to the first set of block parameters. In some embodiments, the transmitting of the video data 302 including the data blocks 320 is by the camera appliance 115. In some embodiments, the camera appliance 115 generates the data blocks 320 according to the first set of block parameters. The video data 320 may be as described at step 202 of the process 200, for example.

At step 924, the camera device 105 receives a configuration command. In some embodiments, the camera 110 receive the configuration command. In some embodiments, the camera appliance 115 receives the configuration command. The configuration command at step 924 may be referred to as a first configuration command. The configuration command may be as described at step 206 of the process 200 and/or at step 906 of the method 900, for example. At step 924 the configuration command indicates to the camera device 105 to perform one or more operations including modifying the transmitting of the video data 302 to allow for a computing device 160 to display near live video of the camera device 105 that would otherwise be unavailable for retrieval from the networked video archiver 150 in absence of the modifying of the transmitting of the video data 302. At step 924 the configuration command indicates to the camera device 105 to modify the transmitting of the video data 302 by generating the data blocks 610 according to a second set of block parameters, where the data blocks 610 generated according to the second set of block parameters are smaller than the data blocks 320 generated according to the first set of block parameters.

At step 926, the camera device 105 transmits video data 302 including data blocks 610 generated in accordance with a second set of block parameters in response to the configuration command. In some embodiments, the camera 110 transmits video data 302 including data blocks 610 generated in accordance with a second set of block parameters in response to the configuration command. In some embodiments, the camera appliance 115 transmits video data 302 including data blocks 610 generated in accordance with a second set of block parameters in response to the configuration command. The transmitting of the video data at step 926 may be as described at step 208 of the process 200, for example.

In some embodiments, the method 920 optionally includes step 928. In some embodiments, the configuration command at step 924 is a first configuration command. At step 928 the camera device 105 receives a second configuration command. In some embodiments, the camera 110 receive the second configuration command. In some embodiments, the camera appliance 115 receives the second configuration command. The second configuration command may be as described at step 220 of the process 200 and/or at step 912 of the method 900, for example. At step 928 the second configuration command indicates to the camera device 105 to perform one or more operations including stopping the modifying of the transmitting of the video data 302 and reverting to generating the data blocks 320 of the video data 302 according to the first set of block parameters. The stopping of the modifying of the transmitting of the video data 302 may include stopping to generate the data blocks 610 according to the second set of block parameters.

At step 930, the camera device 105 transmits video data 302 including data blocks 320 generated in accordance with the first set of block parameters. Step 930 may be performed as described at step 922 of the method 920, for example. The camera device 105 may transmits video data 302 including data blocks 320 generated in accordance with the first set of block parameters in response to the second configuration command. The camera device 105 may transmits video data 302 including data blocks 320 generated in accordance with the first set of block parameters after a set period of time has passed. The set period of time may be specified in the configuration command of step 924. The set period of time may be stored in the settings of the camera device 105. In some embodiments, at step 930, the camera 110 transmits video data 302 including data blocks 320 generated in accordance with the first set of block parameters. In some embodiments, at step 930, the camera appliance 114 transmits video data 302 including data blocks 320 generated in accordance with the first set of block parameters. The transmitting of the video data at step 940 may be as described at step 222 of the process 200, for example.

Figure 10B:
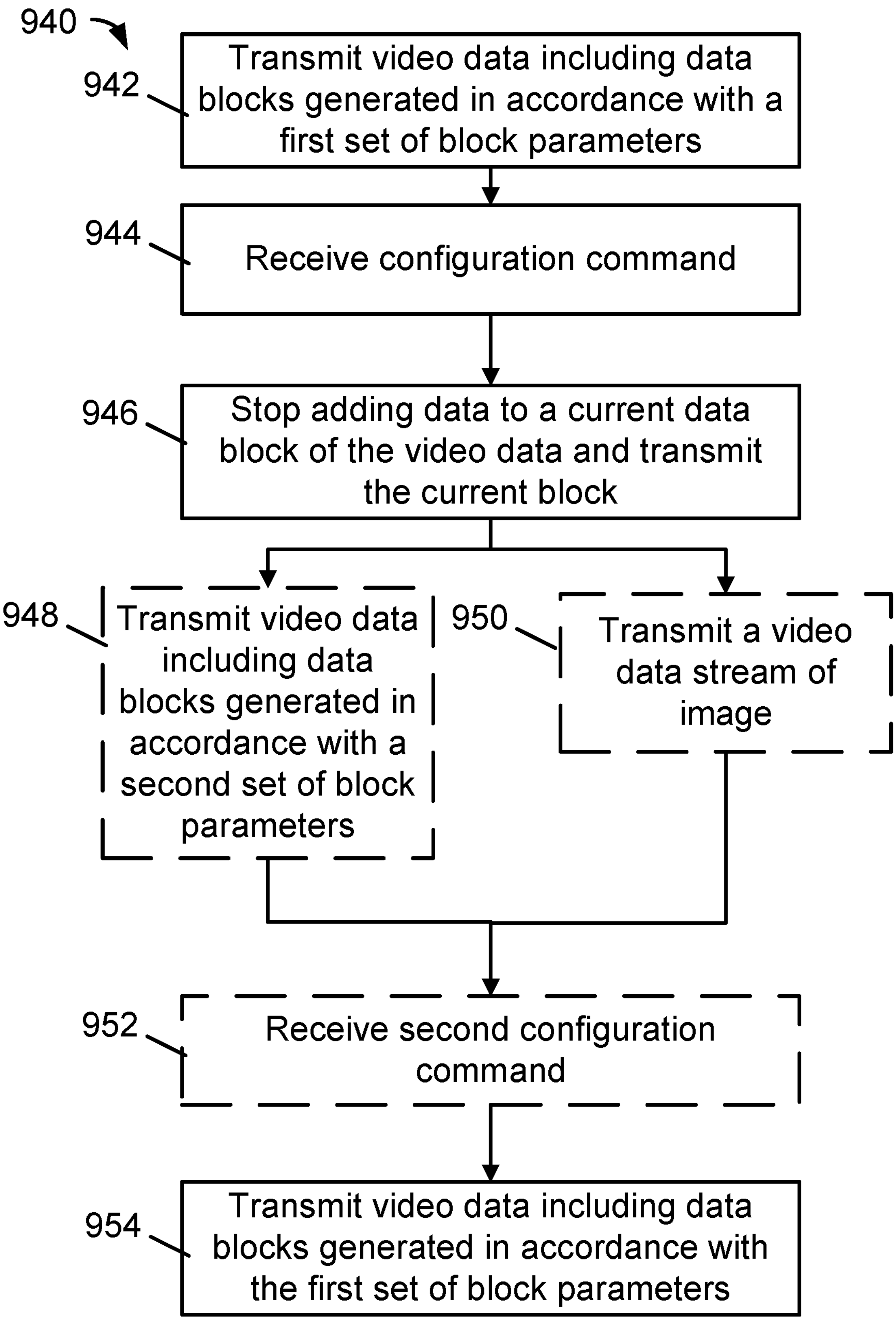
FIG. 10B is a flowchart illustrating a second specific and non-limiting example of a method for providing near live video by the camera device, in accordance with one or more embodiments.

With reference to FIG. 10B, there is shown a flowchart illustrating an example method 940. The method 940 may be performed by the camera device 105, the camera 110, the camera appliance 105 or by any other suitable camera, camera appliance, camera device, computing device, or the like. In explanation of the method 940, any reference to the system 100 (or 100') and to the process 200 is made for example purposes. The system in which the method 940 may operate may vary depending on practical implementations. The method 940 may be performed by the camera device 105, the camera 110 and/or the camera appliance 105 based on one or more instructions from the surveillance computing system 140. The method 940 may be performed to generate the video date 302 of FIGS. 6B and 6E, for example.

Step 942 includes transmitting, by the camera device 105, video data 320 comprising data blocks 320 to the networked video archiver 150. At step 942, the camera device 105 generates the data blocks according to a first set of block parameters. Step 942 may be performed as described at step 922 of the method 920, for example.

At step 944, the camera device 105 receives a configuration command. Step 942 may be performed as described at step 924 of the method 920, for example. The configuration command at step 944 may be referred to as a first configuration command. The configuration command may be as described at step 206 of the process 200 and/or at step 906 of the method 900, for example. At step 944 the configuration command indicates to the camera device 105 to perform one or more operations including modifying the transmitting of the video data 302 to allow for a computing device 160 to display near live video of the camera device 105 that would otherwise be unavailable for retrieval from the networked video archiver 150 in absence of the modifying of the transmitting of the video data 302. At step 944 the configuration command indicates to the camera device 105 to modify the transmitting of the video data 302 by stopping to add data to a current data block 620 being generated for transmission to the networked video archiver 150 and by transmitting the current data block 620 to the networked video archiver 150.

At step 946, the camera device 105 modifies the transmitting of the video data 302 by stopping to add video data to a current data block 620 being generated for transmission to the networked video archiver 150 and by transmitting the current data block 620 to the networked video archiver 150, where the current data block 620 transmitted by the camera device 105 to the networked video archiver 150 is smaller than the data blocks 320 generated according to the first set of block parameters. In some embodiments, the camera 110 stops adding video data to the current data block 620 and transmits the current data block 620. In some embodiments, the camera appliance 115 stops adding video data to the current data block 620 and transmits the current data block 620. The transmitting of the video data at step 946 may be as described at step 208 of the process 200, for example.

In some embodiments, the method 940 optionally includes step 948. At step 948, the camera device 105 transmits video data 302 including data blocks 610 generated in accordance with the second set of block parameters in response to the first configuration command. Accordingly, in some embodiments, the configuration command further causes the camera device 105 to modify the transmitting of the video data 302 by generating the data blocks 610 according to a second set of block parameters, where the data blocks 610 generated according to the second set of block parameters are smaller than the data blocks 320 generated according to the first set of block parameters. Step 948 may be performed as described at step 926 of the method 920, for example.

In some embodiments, the method 940 optionally includes step 950. At step 950, the camera device 105 transmits video data including a video data stream of images 650 in response to the first configuration command. In some embodiments, the camera 110 transmits video data including a video data stream of images 650 in response to the first configuration command. In some embodiments, the camera appliance 115 transmits video data including a video data stream of images 650 in response to the first configuration command. Accordingly, in some embodiments, the configuration command further causes the camera device 105 to modify the transmitting of the video data 302 by transmitting a video data stream of images 650 to the networked video archiver 150.

In some embodiments, the method 940 optionally includes step 952. At step 952 the camera device 105 receives a second configuration command. Step 952 may be performed as described at step 928 of the method 920, for example. At step 952, the second configuration command indicates to the camera device 105 to perform one or more operations including stopping the modifying of the transmitting of the video data 302 and reverting to generating the data blocks 320 of the video data 302 according to the first set of block parameters. The stopping of the modifying of the transmitting of the video data 302 may include stopping to generate the data blocks 610 according to the second set of block parameters of step 948. The stopping the modifying of the transmitting of the video data 302 may include stopping to transmit a video data stream of images 650 of step 950.

At step 954, the camera device 105 transmits video data including data blocks generated in accordance with the first set of block parameters. Step 954 may be performed as described at step 930 of the method 920, for example.

Figure 10C:
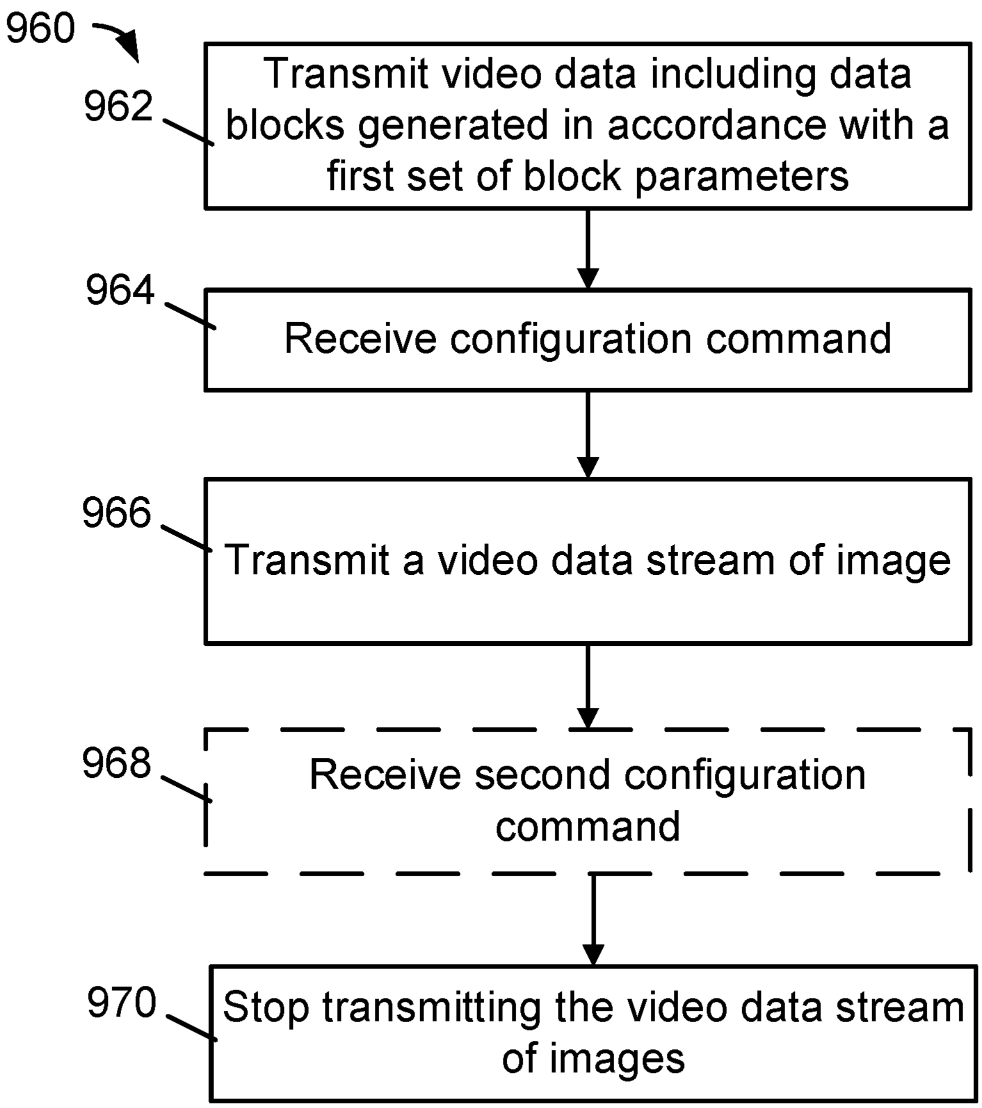
FIG. 10C is a flowchart illustrating a third specific and non-limiting example of a method for providing near live video by the camera device, in accordance with one or more embodiments.

With reference to FIG. 10C, there is shown a flowchart illustrating an example method 960. The method 960 may be performed by the camera device 105, the camera 110, the camera appliance 105 or by any other suitable camera, camera appliance, camera device, computing device, or the like. In explanation of the method 960, any reference to the system 100 (or 100') and to the process 200 is made for example purposes. The system in which the method 960 may operate may vary depending on practical implementations. The method 960 may be performed by the camera device 105, the camera 110 and/or the camera appliance 105 based on one or more instructions from the surveillance computing system 140. The method 960 may be performed to generate the video date 302 of FIG. 6F, for example.

Step 962 includes transmitting, by the camera device 105, video data 320 comprising data blocks 320 to the networked video archiver 150. At step 962, the camera device 105 generates the data blocks according to a first set of block parameters. Step 962 may be performed as described at step 222 of the method 920, for example.

At step 964, the camera device 105 receives a configuration command. Step 964 may be performed as described at step 924 of the method 920, for example. The configuration command at step 964 may be referred to as a first configuration command. The configuration command may be as described at step 206 of the process 200 and/or at step 906 of the method 900, for example. At step 964 the configuration command indicates to the camera device 105 to perform one or more operations including modifying the transmitting of the video data 302 to allow for a computing device 160 to display near live video of the camera device 105 that would otherwise be unavailable for retrieval from the networked video archiver 150 in absence of the modifying of the transmitting of the video data 302. At step 964 the configuration command indicates to the camera device 105 to modify the transmitting of the video data 302 by transmitting a video data stream of images 660 to the networked video archiver 150, in addition to the transmitting of the video data 302 comprising the data blocks 320.

At step 966, the camera device 105 transmits a video data stream of images 660 in response to the configuration command. This video data stream of images is in addition to the transmission of the data blocks 320 generated in accordance with the first set of block parameters. The video data stream of images 660 may be cached at the camera device 105 and may be transmitted by the camera device 105 to the computing device 160 on request. The video data stream of images 660 may be transmitted to the computing device 160 via the networked video archiver 150, such as, for example, via cloud services of the networked video archiver 150.

In some embodiments, the method 960 optionally includes step 968. At step 968 the camera device 105 receives a second configuration command. Step 968 may be performed as described at step 928 of the method 920, for example. At step 952, the second configuration command indicates to the camera device 105 to perform one or more operations including stopping the transmission of the video data stream of images 650.

At step 970, the camera device 105 stops transmitting the video data stream of images 660. The camera device 105 may stop transmitting the video data stream of images 660 in response to the second configuration command. The camera device 105 may stops transmitting the video data stream of images 660 after a set period of time has passed. The set period of time may be specified in the configuration command of step 964. The set period of time may be stored in the settings of the camera device 105. The stopping of the transmitting of the video data stream of images 660 at step 970 may be as described at step 222 of the process 200, for example.

When suitable, the various steps of the methods 920, 940, and 960 described herein may be combined, uncombined, and/or omitted.

Figure 11:
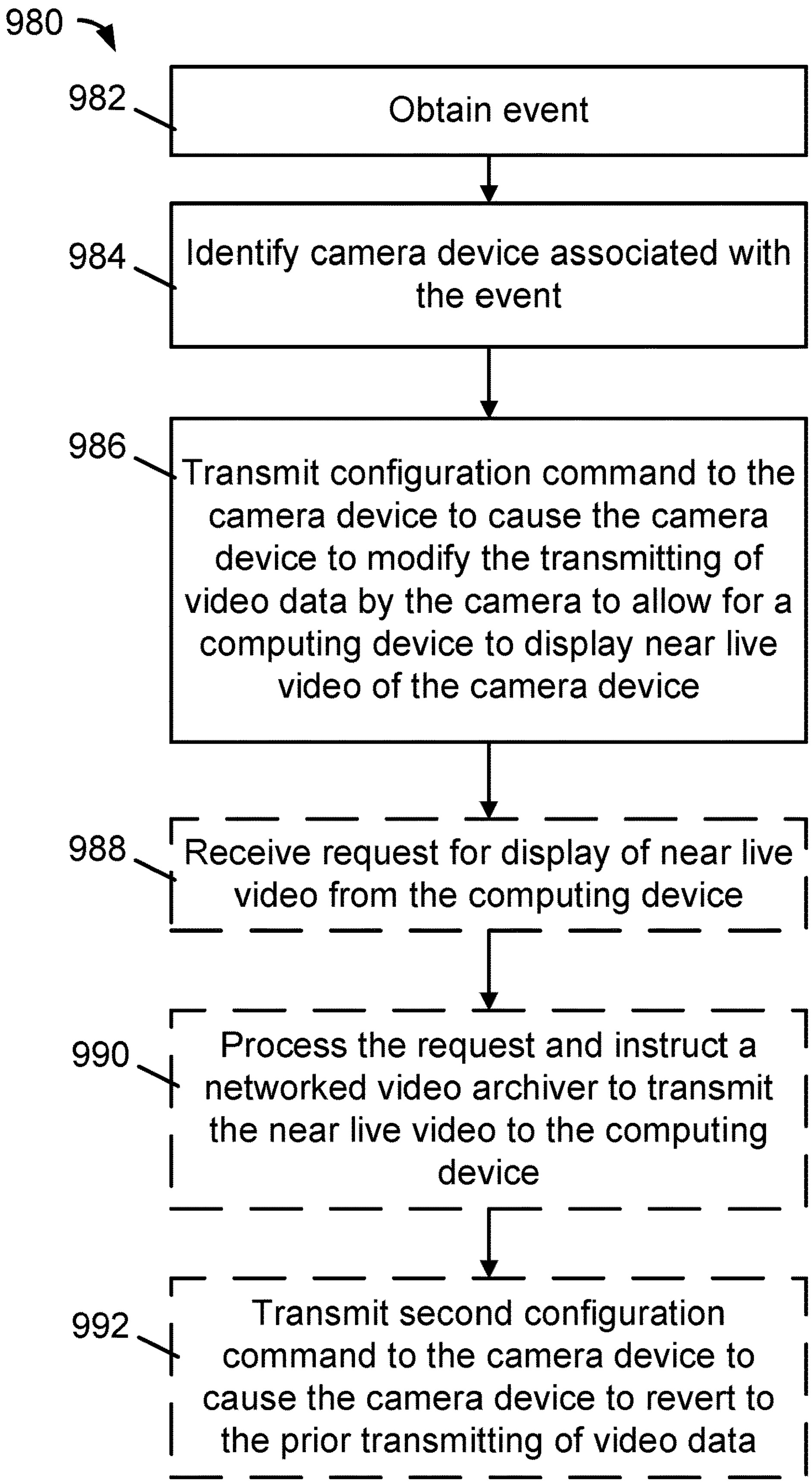
FIG. 11 is a flowchart illustrating another example method for providing near live video by the surveillance computing system, in accordance with one or more embodiments.

With reference to FIG. 11, there is shown a flowchart illustrating an example method 980. The method 980 may be performed by the surveillance computing system 140 or by any other suitable computing device, system, or the like. In explanation of the method 980, any reference to the system 100 (or 100') and to the process 200 is made for example purposes. The system in which the method 980 may operate may vary depending on practical implementations. The method 980 is similar to that of the method 900, and reference may be made to the method 900.

Step 982 includes obtaining, by a surveillance computing system 140, an event. The event, in this example, includes a grouping of data indicative of an occurrence of an event. The event 400 may be a data object, a data item, a data structure or any other suitable grouping of data. The event is similar to the security event 400; however, the event at step 982 do not necessarily pertain to a security issue. In understanding the method 980, the term "security event" in this document, where suitable to do so, may be substituted with "event".

In some embodiments, the event may be a near live video request of a camera device 105 (e.g., the camera 110 and/or camera appliance 115). Accordingly, where suitable to do so, the term "security event" or "event" in this document may be substituted with "near live video request". In some embodiments, the computing device 160 may transmit a near live video request to the surveillance computing system 140. The near live video request may be based on a user requesting the near live video of a specific camera device 105.

In some embodiments, the near live video request may be automatically generated at the computing device 160 and transmitted to the surveillance computing system 140. The near live video request may include one or more camera identifiers corresponding to one or more cameras identified on a map. For example, the computing device 160 may be displaying an interactive map with one or more icons indicative of cameras that video may be viewed, and the computing device 160 may transmit an event to the surveillance computing system 140 with a list of the camera identifiers visible on the map. As the user changes the view and/or location on the map, additional camera icons may be shown and some camera icons may disappear from the map, and various events are sent from the computing device 160 to the surveillance computing system 140 with the camera identifiers of the visible cameras, and in turn, the surveillance computing system 140 enables and disable the cameras from the primary mode operation to the near live video mode of operation.

In some embodiments, the event may be a live video request of a camera device 105 (e.g., the camera 110 and/or camera appliance 115). In some embodiments, a user may drag a camera icon indicative of a specific camera into a tile on a GUI to view live video of that camera, which may trigger the near live video request of that camera. In some embodiments, the computing system 160 may transmit a live video request to the surveillance computing system 140. The near live video request may be based on a user requesting the live video of the camera device 105. For example, the viewing of live video may be indicative of the fact that the user may also want to view near live video at some later time.

Step 984 includes identifying, by a surveillance computing system 140, a camera device 105 associated with the event. Step 984 may be performed as described at step 904 of the method 900, for example.

Step 986 includes transmitting, by the surveillance computing system 104, a configuration command to the camera device 105 identified as associated with the event. Step 986 may be performed as described at step 906 of the method 900, for example.

In some embodiments, the method 980 optionally includes step 988. Step 988 includes receiving, at the surveillance computing system 140, a request for display of the near live video of the camera device 105 from the computing device 106. The receiving of the request for the near live video may be as described at step 908 of the method 900, for example.

In some embodiments, the method 980 optionally includes step 990. Step 990 includes processing, at the surveillance computing system 140, the request for near live video and instructing the networked video archiver 150 to transmit the near live video the computing device 160. The near live video is transmitted to the computing device 160 such that the computing device 160 is able to display the near live video on a display device 165. Step 990 may be as described at step 910 of the method 900, for example.

In some embodiments, the method 980 optionally includes step 992. In some embodiments, the configuration command at step 986 is a first configuration command. Step 992 includes transmitting, by the surveillance computing system 140, a second configuration command to the camera device 105 identified as associated with the event. At step 992, the second configuration the second configuration command causes the camera device 105 to perform one or more operations including stopping the modifying of the transmitting of the video data 302 and reverting to generating the data blocks 320 of the video data 302 according to the first set of block parameters. Step 992 may be as described at step 912 of the method 900, for example.

Figure 12:
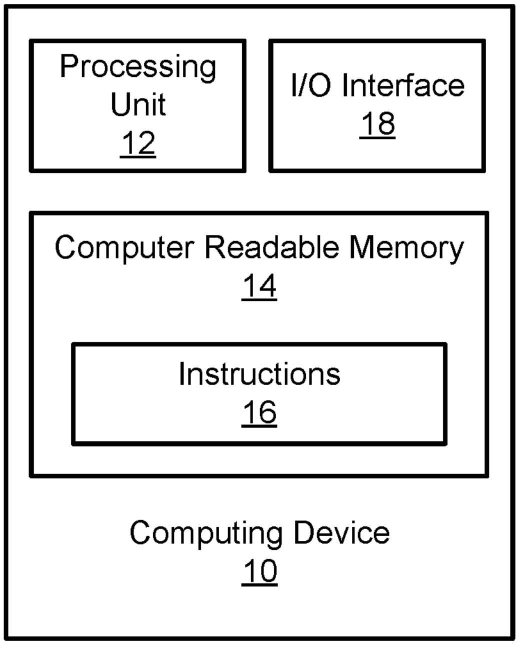
FIG. 12 is a schematic diagram of an example computing device, in accordance with one or more embodiments.

With reference to FIG. 12, any one of the methods 900, 920, 940, 960, 980 may be implemented by one or more computing devices, such as a computing device 10 comprising a processing unit 12 and a memory 14 which has stored therein computer-executable instructions 16. Each of the camera device 105, the camera 110, the camera appliance 115, the video archiver 150, the surveillance computing system 140, the computing device 160, the sensor 120, and the computing device 160 may each be implemented by and/or comprise at least one computing device, such as the computing device 10.

The processing unit 12 may comprise any suitable devices configured to implement any one of the methods 900, 920, 940, 960, 980 such that instructions 16, when executed by the computing device 10 or other programmable apparatus, may cause the functions/acts/steps performed as part of the method 900, 920, 940, 960, 980 as described herein to be executed. The processing unit 12 may comprise, for example, one or more of: any type of general-purpose microprocessor or microcontroller, a digital signal processing (DSP) processor, a central processing unit (CPU), a graphical processing unit (GPU), a neural processing unit (NPU), an integrated circuit, a field programmable gate array (FPGA), a reconfigurable processor, other suitably programmed or programmable logic circuits, or any combination thereof. The processing unit 12 may be referred to as a "processor". Any of the processors 812, 822, 842, 852, and 862 may each be implemented by and/or comprise one or more of the processing unit 12.

The memory 14 may comprise any suitable known or other machine-readable storage medium. The memory 14 may comprise non-transitory computer readable storage medium, for example, but not limited to, an electronic, magnetic, optical, electromagnetic, infrared, or semiconductor system, apparatus, or device, or any suitable combination of the foregoing. The memory 14 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 14 may comprise any storage means (e.g., devices) suitable for retrievably storing machine-readable instructions 16 executable by processing unit 12. The memory 14 may include any suitable hard drives, memory cards, Secure Digital (SD) cards or the like. The memory of the database 500 may be implemented according to the memory 14, and may comprise any suitable known or other machine-readable storage medium. Any of the memory 813, 816, 817, 823, 826, 827, 843, 846, 847, 853, 856, 857, 863, 866, and 867 may each be implemented by and/or comprise one or more of the memory 14.

The I/O interface 18 may include various signal interfaces, analog-to-digital converters (ADCs), digital-to-analog converters (DACs), receivers, transmitters, and/or other circuitry to receive, produce, and transmit signals as described herein, for example. The I/O interface 18 may include a network interface operable to transmit signals to, and receive signals from, a computer network (for example, using a wireless-network access point, or a wired or other wireless connection to a router). The I/O interface 18 may include a near-field communication (NFC) input/output interface 18 operable to transmit NFC radio signals to, and receive NFC radio signals from, a nearby NFC device, a Bluetooth™ input/output interface operable to transmit Bluetooth™ radio signals to, and receive radio Bluetooth™ signals from, a nearby Bluetooth™ device, and an output interface operable to transmit signals to a display device to control a screen and/or user interface on the display device. Any of the interfaces 814, 824, 844, 854, and 864 may each be implemented by and/or comprise one or more of the I/O interface 18.

The methods and systems described herein may be implemented in a high level procedural or object oriented programming or scripting language, or a combination thereof, to communicate with or assist in the operation of a computer system, for example the computing device 10. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 12 of the computing device 10, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for providing near live video by a surveillance computing system, the method comprising:

obtaining, at the surveillance computing system, a security event;

identifying, by the surveillance computing system, a camera device associated with the security event, the camera device transmitting video data comprising data blocks to a networked video archiver for storage; and transmitting, by the surveillance computing system, a configuration command to the camera device identified as associated with the security event, the configuration command causes the camera device to perform one or more operations including modifying the transmitting of the video data to allow for a computing device to display near live video of the camera device that would otherwise be unavailable for retrieval from the networked video archiver in absence of the modifying of the transmitting of the video data.

2. The method of claim 1, the method further comprising:

receiving, at the surveillance computing system, a request for the near live video of the camera device from the computing device; and processing, by the surveillance computing system, the request for near live video and instructing the networked video archiver to transmit the near live video to the computing device such that the computing device displays the near live video.

3. The method of claim 2, wherein the camera device generates the data blocks of the video data according to a first set of block parameters prior to the obtaining of the security event; wherein the configuration command causes the camera device to modify the transmitting of the video data by generating the data blocks according to a second set of block parameters, wherein the data blocks generated according to the second set of block parameters are smaller than the data blocks generated according to the first set of block parameters; and wherein the near live video requested by the computing device corresponds to video transmitted with data blocks generated according to the second set of block parameters from the camera device to the networked video archiver.

4. The method of claim 2, wherein the camera device generates the data blocks of the video data according to a first set of block parameters prior to the obtaining of the security event; and wherein the configuration command causes the camera device to modify the transmitting of the video data by stopping to add data to a current data block being generated for transmission to the networked video archiver and by transmitting the current data block to the networked video archiver; wherein the current data block transmitted by the camera device to the networked video archiver is smaller than the data blocks generated according to the first set of block parameters; and wherein the near live video requested by the computing device corresponds to video transmitted in the current data block from the camera device to the networked video archiver.

5. The method of claim 2, wherein the configuration command indicates to the camera device to transmit a video data stream of images to the networked video archiver, in addition to the transmitting of the video data comprising the data blocks; and wherein the near live video requested by the computing device corresponds to video transmitted in the video data stream of images transmitted by the camera device to the networked video archiver.

6. The method of claim 1, wherein the camera device generates the data blocks of the video data according to a first set of block parameters prior to the obtaining of the security event; and wherein the configuration command causes the camera device to modify the transmitting of the video data by generating the data blocks according to a second set of block parameters, wherein the data blocks generated according to the second set of block parameters are smaller than the data blocks generated according to the first set of block parameters.

7. The method of claim 1, wherein the camera device generates the data blocks of the video data according to a first set of block parameters prior to the obtaining of the security event; and wherein the configuration command causes the camera device to modify the transmitting of the video data by stopping to add data to a current data block being generated for transmission to the networked video archiver and by transmitting the current data block to the networked video archiver; and wherein the current data block transmitted by the camera device to the networked video archiver is smaller than the data blocks generated according to the first set of block parameters.

8. The method of claim 7, wherein the configuration command further causes the camera device to modify the transmitting of the video data by generating the data blocks according to a second set of block parameters, wherein the data blocks generated according to the second set of block parameters are smaller than the data blocks generated according to the first set of block parameters.

9. The method of claim 7, wherein the configuration command further causes the camera device to modify the transmitting of the video data by transmitting a video data stream of images to the networked video archiver.

10. The method of claim 1, wherein the configuration command comprises at least one of a command to stop video data block transmission and a request for transmission of a video data stream of images to the networked video archiver.

11. The method of claim 1, wherein the configuration command indicates to the camera device to transmit a video data stream of images to the networked video archiver, in addition to the transmitting of the video data comprising the data blocks.

12. The method of claim 1, wherein the configuration command is a first configuration command; wherein the camera device generates the data blocks of the video data according to a first set of block parameters prior to receiving the first configuration command; and wherein the method further comprises transmitting, by the surveillance computing system, a second configuration command to the camera device identified as associated with the security event, the second configuration command causes the camera device to perform one or more operations including stopping the modifying of the transmitting of the video data and reverting to generating the data blocks of the video data according to the first set of block parameters.

13. A computing system for providing near live video, the computing system comprising:

at least one processor; and at least one non-transitory computer-readable memory having stored thereon program instructions executable by the at least one processor for:

obtaining a security event;

identifying a camera device associated with the security event, the camera device transmitting video data comprising data blocks to a networked video archiver for storage; and transmitting a configuration command to the camera device identified as associated with the security event, the configuration command causes the camera device to perform one or more operations including modifying the transmitting of the video data to allow for a computing device to display near live video of the camera device that would otherwise be unavailable for retrieval from the networked video archiver in absence of the modifying of the transmitting of the video data.

14. The computing system of claim 13, wherein the program instructions are further executable by the at least one processor for:

receiving a request for the near live video of the camera device from the computing device; and processing the request for near live video and instructing the networked video archiver to transmit the near live video to the computing device such that the computing device displays the near live video.

15. The computing system of claim 14, wherein the camera device generates the data blocks of the video data according to a first set of block parameters prior to the obtaining of the security event; wherein the configuration command causes the camera device to modify the transmitting of the video data by generating the data blocks according to a second set of block parameters, wherein the data blocks generated according to the second set of block parameters are smaller than the data blocks generated according to the first set of block parameters; and wherein the near live video requested by the computing device corresponds to video transmitted with data blocks generated according to the second set of block parameters from the camera device to the networked video archiver.

16. The computing system of claim 14, wherein the camera device generates the data blocks of the video data according to a first set of block parameters prior to the obtaining of the security event; and wherein the configuration command causes the camera device to modify the transmitting of the video data by stopping to add data to a current data block being generated for transmission to the networked video archiver and by transmitting the current data block to the networked video archiver; wherein the current data block transmitted by the camera device to the networked video archiver is smaller than the data blocks generated according to the first set of block parameters; and wherein the near live video requested by the computing device corresponds to video transmitted in the current data block from the camera device to the networked video archiver.

17. The computing system of claim 14, wherein the configuration command indicates to the camera device to transmit a video data stream of images to the networked video archiver, in addition to the transmitting of the video data comprising the data blocks; and wherein the near live video requested by the computing device corresponds to video transmitted in the video data stream of images transmitted by the camera device to the networked video archiver.

18. The computing system of claim 13, wherein the camera device generates the data blocks of the video data according to a first set of block parameters prior to the obtaining of the security event; and wherein the configuration command causes the camera device to modify the transmitting of the video data by generating the data blocks according to a second set of block parameters, wherein the data blocks generated according to the second set of block parameters are smaller than the data blocks generated according to the first set of block parameters.

19. The computing system of claim 13, wherein the camera device generates the data blocks of the video data according to a first set of block parameters prior to the obtaining of the security event; and wherein the configuration command causes the camera device to modify the transmitting of the video data by stopping to add data to a current data block being generated for transmission to the networked video archiver and by transmitting the current data block to the networked video archiver; and wherein the current data block transmitted by the camera device to the networked video archiver is smaller than the data blocks generated according to the first set of block parameters.

20. The computing system of claim 19, wherein the configuration command further causes the camera device to modify the transmitting of the video data by generating the data blocks according to a second set of block parameters, and wherein the data blocks generated according to the second set of block parameters are smaller than the data blocks generated according to the first set of block parameters.

21. The computing system of claim 19, wherein the configuration command further causes the camera device to modify the transmitting of the video data by transmitting a video data stream of images to the networked video archiver.

22. The computing system of claim 13, wherein the configuration command comprises at least one of a command to stop video data block transmission and a request for transmission of a video data stream of images to the networked video archiver.

23. The computing system of claim 13, wherein the configuration command indicates to the camera device to transmit a video data stream of images to the networked video archiver, in addition to the transmitting of the video data comprising the data blocks.

24. The computing system of claim 13, wherein the configuration command is a first configuration command; wherein the camera device generates the data blocks of the video data according to a first set of block parameters prior to receiving the first configuration command; and wherein the program instructions are further executable by the at least one processor for transmitting a second configuration command to the camera device identified as associated with the security event, the second configuration command causes the camera device to perform one or more operations including stopping the modifying of the transmitting of the video data and reverting to generating the data blocks of the video data according to the first set of block parameters.

25. A non-transitory computer-readable storage medium having stored thereon program instructions which, when executed, cause at least one processor to:

obtain a security event;

identify a camera device associated with the security event, the camera device transmitting video data comprising data blocks to a networked video archiver for storage; and transmit a configuration command to the camera device identified as associated with the security event, the configuration command causes the camera device to perform one or more operations including modifying the transmitting of the video data to allow for a computing device to display near live video of the camera device that would otherwise be unavailable for retrieval from the networked video archiver in absence of the modifying of the transmitting of the video data.

26. The non-transitory computer-readable storage medium of claim 25, wherein the camera device generates the data blocks of the video data according to a first set of block parameters prior to obtaining of the security event; and wherein the configuration command causes the camera device to modify the transmitting of the video data by generating the data blocks according to a second set of block parameters, wherein the data blocks generated according to the second set of block parameters are smaller than the data blocks generated according to the first set of block parameters.

27. The non-transitory computer-readable storage medium of claim 25, wherein the camera device generates the data blocks of the video data according to a first set of block parameters prior to obtaining of the security event; and wherein the configuration command causes the camera device to modify the transmitting of the video data by stopping to add data to a current data block being generated for transmission to the networked video archiver and by transmitting the current data block to the networked video archiver; and wherein the current data block transmitted by the camera device to the networked video archiver is smaller than the data blocks generated according to the first set of block parameters.

28. The non-transitory computer-readable storage medium of claim 27, wherein the configuration command further causes the camera device to modify the transmitting of the video data by generating the data blocks according to a second set of block parameters, wherein the data blocks generated according to the second set of block parameters are smaller than the data blocks generated according to the first set of block parameters.

29. The non-transitory computer-readable storage medium of claim 27, wherein the configuration command further causes the camera device to modify the transmitting of the video data by transmitting a video data stream of images to the networked video archiver.

30. The non-transitory computer-readable storage medium of claim 25, wherein the configuration command comprises at least one of a command to stop video data block transmission and a request for transmission of a video data stream of images to the networked video archiver.

31. The non-transitory computer-readable storage medium of claim 25, wherein the configuration command indicates to the camera device to transmit a video data stream of images to the networked video archiver, in addition to the transmitting of the video data comprising the data blocks.

* * * * *